US007313918B2

(12) United States Patent
Melchior

(10) Patent No.: US 7,313,918 B2
(45) Date of Patent: Jan. 1, 2008

(54) ALTERNATIVE (RECIPROCATING) ENGINE WITH RECIRCULATION OF EXHAUST GASES INTENDED FOR THE PROPULSION OF AUTOMOBILES AND METHOD TURBOCHARGING THESE MOTORS

(76) Inventor: Jean Frédéric Melchior, 16 rue de l'Abbaye, 75006 Paris (FR)

( * ) Notice: Subject to any disclaimer, the term of this patent is extended or adjusted under 35 U.S.C. 154(b) by 0 days.

(21) Appl. No.: 10/808,609

(22) Filed: Mar. 25, 2004

(65) Prior Publication Data

US 2007/0271919 A1 Nov. 29, 2007

(30) Foreign Application Priority Data

Mar. 26, 2003 (FR) .................................. 03 03728

(51) Int. Cl.

| | |
|---|---|
| ***F02B 33/44*** | (2006.01) |
| ***F02B 31/00*** | (2006.01) |
| ***F02B 75/02*** | (2006.01) |
| ***F02B 33/00*** | (2006.01) |
| ***F02M 25/07*** | (2006.01) |
| ***F02M 7/00*** | (2006.01) |
| ***F02N 3/00*** | (2006.01) |
| *F01L 9/02* | (2006.01) |
| *F01L 1/34* | (2006.01) |

(52) U.S. Cl. ..................... 60/605.2; 123/306; 123/257; 123/188.14; 123/435; 123/559.1; 123/90.13; 123/90.15

(58) Field of Classification Search ............... 60/605.2, 60/602; 123/435–315, 90.13, 90.22, 90.33, 123/90.48, 90.15, 90.43, 188.14, 306–308
See application file for complete search history.

(56) References Cited

U.S. PATENT DOCUMENTS

| | | | | |
|---|---|---|---|---|
| 1,370,346 | A * | 3/1921 | Nelson | 123/90.33 |
| 3,009,450 | A * | 11/1961 | Engemann | 123/90.43 |
| 3,056,392 | A * | 10/1962 | Daub | 123/90.22 |
| 3,315,650 | A * | 4/1967 | Bishop et al. | 123/255 |
| 3,494,336 | A * | 2/1970 | Myers et al. | 123/90.15 |
| 4,187,823 | A * | 2/1980 | Brown, Jr. | 123/188.14 |
| 4,426,848 | A | 1/1984 | Stachowicz | 60/605.2 |
| 4,744,340 | A * | 5/1988 | Kirby | 123/188.14 |

(Continued)

FOREIGN PATENT DOCUMENTS

DE 32 25 867 1/1984

(Continued)

*Primary Examiner*—Thai-Ba Trieu
(74) *Attorney, Agent, or Firm*—Stites & Harbison PLLC; Douglas E. Jackson

(57) ABSTRACT

A reciprocating engine includes a turbocharging unit that: supplies the intake manifold with air via a coolant; is supplied with gas by the exhaust manifold; and has the turbine supply pressure substantially equal to the compressor discharge pressure. At constant air temperature, the turbocharging unit delivers a substantially constant volume of cooled air when the pressure varies, and the volume is substantially proportional to the turbine outlet section. The turbine pressure is maintained substantially equal to compressor pressure by a EGR bypass between the intake and exhaust manifold. In addition, the volume of air is less than the volume drawn in at the speed so that a flow of hot gases is drawn in again via the bypass above the speed, where the volume drawn in is equal to the volume, and a flow of air is deflected towards the turbine below the speed.

26 Claims, 9 Drawing Sheets

Ⓐ AIR GAS 2 P2 T2 7 5 4 3 6 Pin Tin 8 J 9 P3 T3

Figure 1:
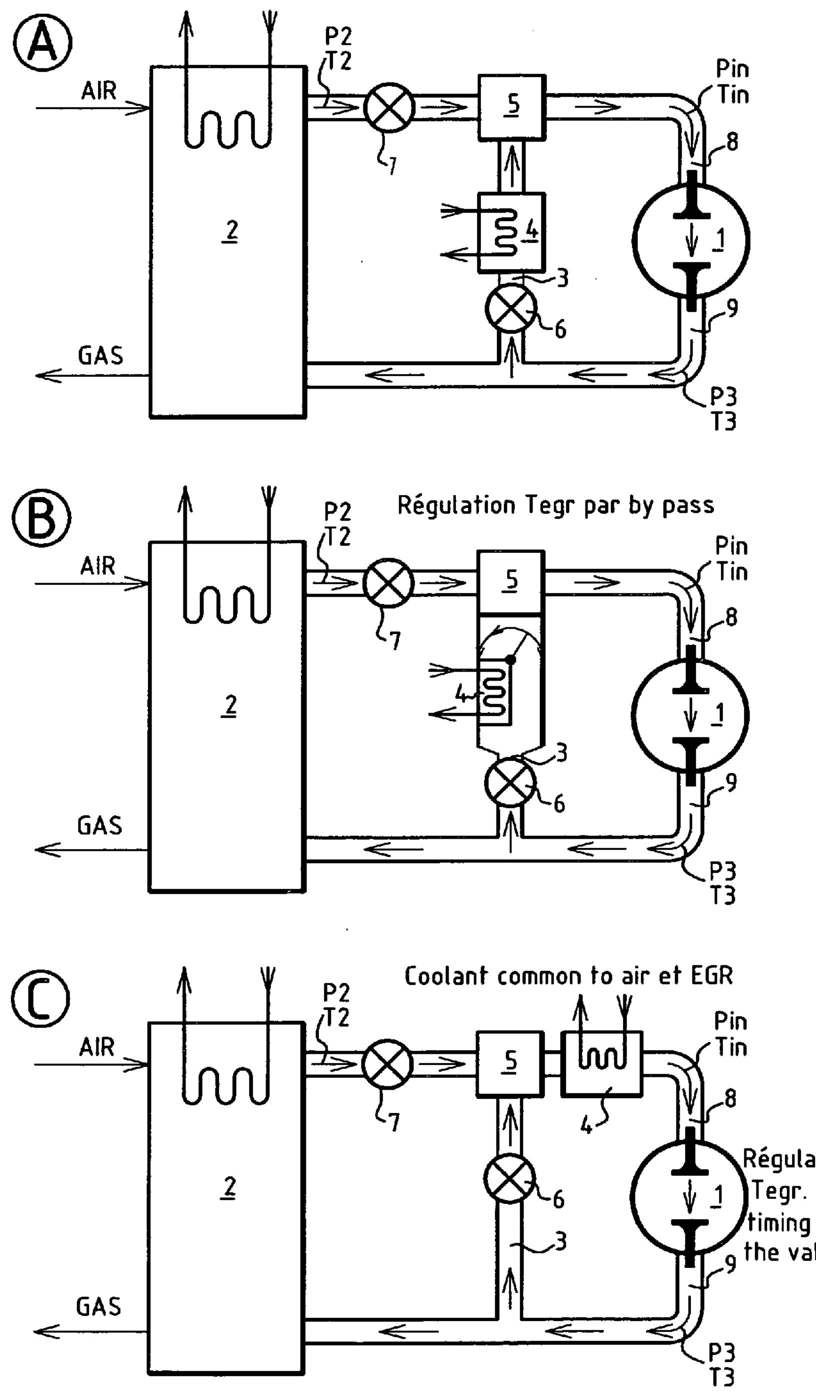

Ⓑ Régulation Tegr par by pass AIR GAS 2 P2 T2 7 5 4 3 6 Pin Tin 8 J 9 P3 T3

Ⓒ Coolant common to air et EGR AIR GAS 2 P2 T2 7 5 4 6 3 Pin Tin 8 J 9 Régulation Tegr. by timing of the valves P3 T3

U.S. PATENT DOCUMENTS 5,014,663 A * 5/1991 Melchior .................... 123/257
5,042,443 A * 8/1991 Romanelli .................. 123/315
5,406,796 A * 4/1995 Hiereth et al. ............. 60/605.2
5,509,394 A * 4/1996 Hitomi et al. ........... 123/559.1
5,517,954 A 5/1996 Melchior ................. 123/65 W
5,802,846 A * 9/1998 Bailey ........................ 60/605.2
6,003,315 A * 12/1999 Bailey ........................ 60/605.2
6,038,860 A 3/2000 Bailey ........................ 60/605.2
6,205,785 B1 * 3/2001 Coleman ................... 60/605.2
6,209,324 B1 * 4/2001 Daudel et al. ............. 60/605.2
6,234,123 B1 * 5/2001 Iiyama et al. ............ 123/90.15
6,276,334 B1 * 8/2001 Flynn et al. ................ 123/435
6,286,482 B1 * 9/2001 Flynn et al. ................ 123/435
6,354,084 B1 * 3/2002 McKinley et al. ......... 60/605.2
6,360,732 B1 3/2002 Bailey et al. .............. 60/605.2
6,381,961 B1 5/2002 Bischoff .................... 60/605.2
6,397,597 B1 * 6/2002 Gartner ..................... 60/605.2
6,431,140 B1 * 8/2002 Nishimura et al. ......... 123/306
6,539,716 B2 * 4/2003 Finger et al. .............. 60/605.2
6,561,157 B2 * 5/2003 zur Loye et al. ........... 123/435
6,625,986 B2 * 9/2003 Mazaud et al. ............... 60/602
6,662,562 B2 * 12/2003 Engel et al. .................. 60/602
6,766,778 B2 * 7/2004 Hammer .................. 123/90.48
2003/0005898 A1 * 1/2003 Gianolio et al. ......... 123/90.13
2004/0069256 A1 4/2004 Melchior ................. 123/90.12

FOREIGN PATENT DOCUMENTS

| | | | | |
|---|---|---|---|---|
| DE | 42 40 239 | | | 6/1994 |
| EP | 0 869 275 | | | 10/1998 |
| EP | 1 138 928 | | | 10/2001 |
| FR | 2847005 | A1 | * | 5/2004 |
| JP | 10318046 | A | * | 12/1998 |

* cited by examiner

101. HP TURBOCHARGER
102. LP TURBOCHARGER
103. HP/LP DOUBLE WASTE GATE WITH ELECTRIC CONTROL AND PNEUMATIC ROCKING
104. CONTROLLED EGR VALVE
105. CONTROLLED INTAKE VALVE
106. CONTROLLED EGR COOLABT BYPASS GUILLOTINE
107. LP AIR/AIR COOLANT
108. HP AIR/WATER EGR COOLANT
109. GAS/WATER EGR COOLANT
110. MIXER OF HOT EGR/COLD EGR/FRESH AIR
111. HP TURBINE OUTLET CONDUIT

ALTERNATIVE (RECIPROCATING) ENGINE WITH RECIRCULATION OF EXHAUST GASES INTENDED FOR THE PROPULSION OF AUTOMOBILES AND METHOD TURBOCHARGING THESE MOTORS

BACKGROUND OF THE INVENTION

1. Field of the Invention

In the past the thermodynamic cycles of automobile engines were optimised for thermal efficiency and specific power.

Nowadays, added to the criteria of efficiency and specific power are the constraints of depollution and particularly the elimination of NOX. These constraints are currently limited to the conditions of urban use of the engine and to road journeys at low power. The foreseeable tightening up of the regulations will lead to an extension of the depolluted range of use of the engine.

The depolluted range is currently limited to 50% of the maximum speed and 50% of the maximum torque, the engine being supplied with fresh air within the range of the raised torques and power.

Numerous techniques for depollution by post-treatment of the gases discharged into the atmosphere are used or are in the course of development, such as oxidoreduction catalysts and regeneratable filters for particles and for NOX.

Amongst the pollutants, the most difficult ones to post-treat in the presence of oxygen are NOX, and attempts are made to eliminate these at source by diluting the fresh air with exhaust gases (EGR) which are recirculated externally or recycled internally. In order to limit the flame temperature sufficiently, the flow rate of EGR by mass must reach 50% of the thermodynamic mass present in the cylinder.

The drawback of this process is to reduce the volume available in the cylinder by 50% in order to collect the fresh air necessary for combustion. Therefore the re-establishment of the power necessitates doubling of the pre-compression of the combustive charge by turbocharging.

Moreover, a turbocharged automobile engine must supply the breakaway torque of the vehicle at the clutch speed and its maximum torque at a speed which is as low as possible. The supercharging pressure must therefore be established very quickly when the engine passes from the idling speed to the clutch speed.

2. Description of Related Art

The industry is researching turbomachinery capable of delivering a variable volume of air at a constant air pressure of approximately 2.5 bars over the entire useful range of speeds (number of revolutions per minute) of the engine which nowadays extends from 1 to 4 approximately.

This level of pressure derives from one single compression stage with a characteristic diagram as wide as possible.

The output section of the turbine must vary substantially within the same proportions as the flow of air.

The solution with the best performance currently is the turbine with a variable distributor which can cover a homogeneous range of 1 to 3 with the maximum width of the compressor field.

At the extremities of this range the efficiency of the compressor is approximately 60% and that of the turbine 50%. These efficiency rates improve towards the centre of the range to reach 75% and 65% respectively.

Therefore a quarter of the engine speed is not covered by the compressor. The torque at low speed is generally favoured and the power decreases from 75% of the maximum speed.

Another solution consists of bypassing the turbine by a controlled valve known as a waste gate. The range of flow rate only goes from 1 to 2. The expansion efficiency decreases between the minimum flow and the maximum flow.

In order to compensate for the dissipation of energy and to extend the flow rate range, it is necessary to increase the exhaust pressure at the expense of an increase in the pumping losses.

These solutions with low energy efficiency are sufficient at moderate pressure where the enthalpy available in the exhaust gases is excessive.

For a double pressure the global turbocharging efficiency must be improved.

The external recycling of cooled gases is managed by a controlled EGR (exhaust gas recirculation) valve which diverts towards the intake a cooled fraction of the gas flow emitted by the engine in the depolluted range exclusively. When this fraction exceeds a limit, the exhaust temperature becomes insufficient to ensure the turbine/compressor energy balance. In order to compensate for this temperature deficiency at depolluted low speeds, the rate of expansion is increased by reducing the section of the turbine at the expense of a decline in the indicated efficiency. When the speed increases, the distributor or the waste gate opens progressively in order to reduce the EGR rate and to limit the back pressure.

This manoeuvre is only possible above a certain speed which depends upon the size of the turbine.

These operations are carried out with poor energy efficiency due to the energy losses in the waste gate or in the variable distributor of the turbine. Furthermore, the back pressure increases the engine consumption over the depolluted range of operation which is very much used in urban driving.

The variable geometry of the turbine is very stressed in urban driving.

In order to improve the expansion efficiency it is necessary to keep to turbines with fixed geometry and to limit the operations with laminations of the flows.

The two-stage compression makes it possible to generate high pressures by taking advantage of the cooling between stages which reduces the compression work.

In order to generate the pressure necessary for the vehicle breakaway torque, the high pressure section of the HP turbine must be sufficiently small to allow expansion of the gas flow emitted by the engine at the clutch speed, that is to say approximately 20% of the volume flow at the maximum speed. In order to limit the exhaust back pressure at high speeds it is necessary to increase the section offered to the gases when the speed increases.

The R2S method of 3K WARNER provides for the mounting in series of the two compressors and the two turbines. In order to increase the section offered to the gases, the gas flow is transferred progressively from the small HP turbine to the large low-pressure LP turbine at the expense of a loss of energy in the regulated bypass of the high-pressure turbine. The increase in the section offered to the gases is limited to the section of the LP turbine. Moreover, the opening of the bypass cancels the rate of expansion of the HP turbine which no longer drives the HP compressor which constitutes a throttling which must be bypassed.

The sequential turbocharging provides for the turbochargers and the turbines to be mounted in parallel. One single turbocharger is active at low speed whilst the two compressors are active at high speed. The transition is made at the much-used intermediate speeds which are used a great deal with a drop in the turbocharging output.

This solution has the advantage of offering to the gases a maximum section equal to the sum of the two turbines.

As before, the transition is made with a loss of energy by lamination in a much-used zone.

Moreover, the air pressure is limited as in the case of the single turbocharger.

In the two preceding cases certain transitions involve the acceleration of one of the rotors, which may prove too slow in the rapid transitions of urban driving.

In order to avoid breaks, the patent application W002/48510 describes a method of unregulated turbocharging with two stages of fixed geometry mounted in series where the pressure in the cylinder is limited by the loss of pressure created by the undersized intake ports. This very simple solution improves the performance at low speed to the detriment of the performance at high speed, where the pumping losses are high, the exhaust pressure being proportional to the speed.

The present invention relates to a method of turbocharging using the advantages of the series and parallel configurations in an original strategy for recycling of the gases.

BRIEF SUMMARY OF THE INVENTION

To increase the proportion of EGR and/or the engine torque by increasing the supercharging pressure by the mounting in series of two compressors with air cooling between the compressors, to eliminate the drop in power at high speed, to reduce the time lag for engagement of torque from idling and on engine pickup, to improve the combustion and the catalytic depollution after cold starting and at very lower power, to exploit the well-developed technology of waste gates by limiting the modes of operation with throttling of the gas flows, to reduce the volumetric ratio in order to comply with the maximum pressure permitted in the cylinder whilst retaining the capabilities on starting and on silent idling in cold weather, to extend the depolluted range of the field of use of the engine.

An engine with double turbocharging, with recycling of the exhaust gases and with variable timing of the valves has a large number of operating parameters which interact with one another.

The structure includes a limited number of control elements in order to create relationships between the parameters controlled by the engine control computer. These relationships make it possible to generate a very large number of modes of operation of the engine.

The invention resides in the novel inter-parameter relationships and the means for implementing them.

Taking into account the complexity of the interactions concerned, the invention will be described by its general concepts and several non-limiting elementary modes of carrying it out.

In order to facilitate the explanation, the invention will be described on a typical engine of which the elements involving figures are approximate and are not made the subject of a numerical simulation.

It goes without saying that the numerical values are given in order to illustrate the description of the invention and that they are not limiting in any way.

The basic principle is to introduce into the cylinder the mass of fresh air necessary for the combustion at a temperature (Tin) and at a pressure (Pin) such that the volume of this air is always less than the volume trapped upon closure of the valves, in order to leave space for a mass of EGR which is preferably at least equivalent in the majority of the range of operation of the engine.

In the following description the volume Vm drawn in by the engine is defined as the product of the volume trapped by the number of cycles per minute, regardless of whether it is a 2-stroke or 4-stroke cycle.

The invention provides for this condition to be met either by adjustment of the volume Vc delivered by the compressors or by adjustment of the trapped volume Vm if the timing of the valves is variable, or by the two adjustments carried out preferably successively so as not to multiply the simultaneous adjustments.

In order to optimise the turbocharging efficiency and to avoid the variations in geometry in rapid transitions, the invention provides several configurations with fixed geometry offering several levels of power with the same maximum torque. Thus it is possible to envisage a town configuration, an open-road configuration and a motorway configuration.

For engines with fixed timing of the valves, the invention describes turbocharging units which make it possible to adjust the volume Vc of cooled air between 1 and 3 at a constant compressor outlet pressure P2 chosen by way of example for the requirements of the description at 4.5 bars.

For engines with variable timing of the valves, the invention provides for covering the mass flow rate range between 1 and 2 by adjusting the air pressure P2 between 4.5 bars and 9 bars with fixed geometry and therefore at a substantially constant volume Vc, then by increasing the output section of the turbine Sd by only 50% (instead of 300% previously) in order to cover the mass flow rate range from 2 to 3 at constant P2 and at variable Vc.

In the majority of modes, the invention provides for maintaining approximately the equality of pressure P2 at the compressor outlet and P3 at the turbine inlet in order to effect the recycling of the gases with minimal pumping losses.

This relationship also has the advantage of positioning the gas turbine engines on stationary lines of their characteristic diagrams for a given geometry.

In the case of the 2-stroke cycle where the scavenging imposes P2>P3, the volume of the exhaust manifold is chosen to be sufficiently small so that P3 undergoes pulsations around a mean value equal to P2. The scavenging is then effected in the fraction of period where P2>P3 and the recycling is effected when P3>P2.

The volume Vc of aftercooled air discharged by the compressors only depends in these conditions upon the outlet section offered to the gases, that is to say upon the geometry of the turbines and of their bypasses.

For a given geometry, therefore, this volume is substantially constant for all the loads and all the speeds of the engine.

The invention provides for dimensioning of the turbine so that Vc is always less, and preferably less than half of the volume drawn in by the engine in its depolluted range. For the specification of modern engines, this volume corresponds substantially to the volume drawn in by the engine on idling in the most closed configuration of the turbines. We will fix the idling speed at 700 rpm for the purposes of the description.

For the engines with fixed timing of the valves the maximum volume of air will therefore be the volume Vm drawn in by the engine at 2100 rpm, and for the engines with variable timing where P2 is no longer limited by the engine it will be the volume Vm at 1050 rpm.

In propulsion mode the volume drawn in by the engine varies very rapidly with the speed and the timing of the valves. The present invention provides for the volume not occupied by fresh air Vm−Vc to be filled instantaneously by a mass of exhaust gases, preferably at least equal to the mass of fresh air, recycled at a temperature compatible with the energy balance between the turbines and the compressors.

This temperature is defined by the upper isochore of the entropy diagram.

To summarise, contrary to the prior art which imposes upon the compressor the volume of air drawn in by the engine, the invention compensates by the EGR for the difference between the volume drawn in by the engine and the constant volume delivered by the turbomachinery in a fixed geometric configuration. Therefore the prior art provided Vc=Vm outside the depolluted range, whilst the invention provides Vm=Vc+Vegr (volume of the EGR gases) in all the range of use.

This strategy makes it possible to cover all the range of use of the engine situated below the curve at the maximum P2 permitted for the engine in question, without having to modify the geometry of the turbocharging unit. This curve is described at constant engine power proportional to Vc and P2.

When the temperature of the combustive mixture increases, the cycle shifts towards the right of the entropy/temperature diagram.

In atmospheric intake, the EGR is not cooled to place the engine cycle to the right of the entropy/temperature diagram, the partial loads being effected at a constant combustion ending temperature and at a variable combustion starting temperature.

Thus the exhaust temperature retains a maximum level favourable to the establishment of the turbocharging and to the catalytic depollution.

Depending upon the case, the mixture between the fresh air and the gases is produced in the intake conduit, in the cylinder or in both. The invention preferably provides devices for homogenising the combustive charge.

The invention is based upon turbocharging in two stages with cooling of the air upstream and downstream of the high-pressure compressor.

This method of compression imposes certain relationships between the flow rate and the pressure of the air delivered which depend upon the characteristic diagrams of the compressors.

Modern automobile engines must supply their maximum torque at 25% of the maximum speed.

The ideal would therefore be a volume flow Vc varying from 1 to 4 delivered at double pressure and at a volume which is half the volume drawn in by the engine.

The turbines with variable distributor make it possible to cover a range from 1 to 3 with an efficiency of 50% at the extremities of the range.

The compressors associated with these turbines pay in efficiency for this flexibility of flow. The efficiency at the extremity of the range does not exceed 60%. Apart from the fact that the desired range is not reached, the global turbocharging efficiency is insufficient to double the pressure of 2.25 bars currently necessary for the maximum torque without recycling of gases.

Between 25% and 75% of the maximum speed the turbocharging efficiency is sufficient to maintain the nominal intake pressure, but between 75% and 100% it slumps, and with it so does the power.

The generalisation of a proportion by mass of EGR of 50% would reduce by 50% the torque at low speed and would involve a slump in the power from 37.5% of the maximum speed.

The use of turbomachinery with fixed geometry and a narrower operating range provides a gain of 10 to 15% over the efficiency of compressors and turbines.

In order to cover the flow rate range from 1 to 3 at constant pressure the low-pressure compressor according to the invention delivers its minimum flow at low pressure and its maximum flow at high pressure.

The role of the high-pressure compressor is to terminate the compression up to required level fixed at 4.5 bars in order to fix ideas. The pressure ratio of the HP compressor must therefore vary as a function of the flow by means of a variable geometry in the supply to the turbines.

In order to cover the range from 1 to 1.5 it is sufficient partially to bypass the HP turbine or a small opening in its distributor which has a less detrimental effect on efficiency.

The efficiency of the HP compressor is greater in this second case, as the diagrams 9 and 10 show.

In order to avoid adjustments to the geometry which destroy the efficiency, the present invention provides modes of operation with fixed geometry in which the full load is effected partially at constant power and at a variable proportion by volume of EGR.

Over the constant power curves, the compressors take up a position on a single point of operation when the speed varies.

The partial loads are effected at variable pressure and flow rate according to a single curve in the diagram of each compressor which is chosen within the zones of good efficiency.

The volume by mass of EGR is then adjusted by its temperature.

When the power of one mode becomes insufficient, the invention provides for the variable geometry to be activated in order to increase the Vc of the mode either so as to pass to another mode with fixed geometry or to throttle the EGR by pass in order to increase the turbine pressure P3.

By way of example, the objective which the invention makes it possible to achieve could be summarised as follows for a current depolluted diesel engine:

idling is at 700 rpm clutch engagement is at 1000 rpm the maximum torque is available between 1200 rpm and 3400 rpm the maximum power is available between 3400 rpm and 5000 rpm the intake and exhaust pressures are limited to 4.5 bars the proportion by mass of EGR in the depolluted range is 40% at 1200 rpm and greater than 50% between 1400 and 5000 rpm.

BRIEF DESCRIPTION OF THE SEVERAL VIEWS OF THE INVENTION

Figure 2:
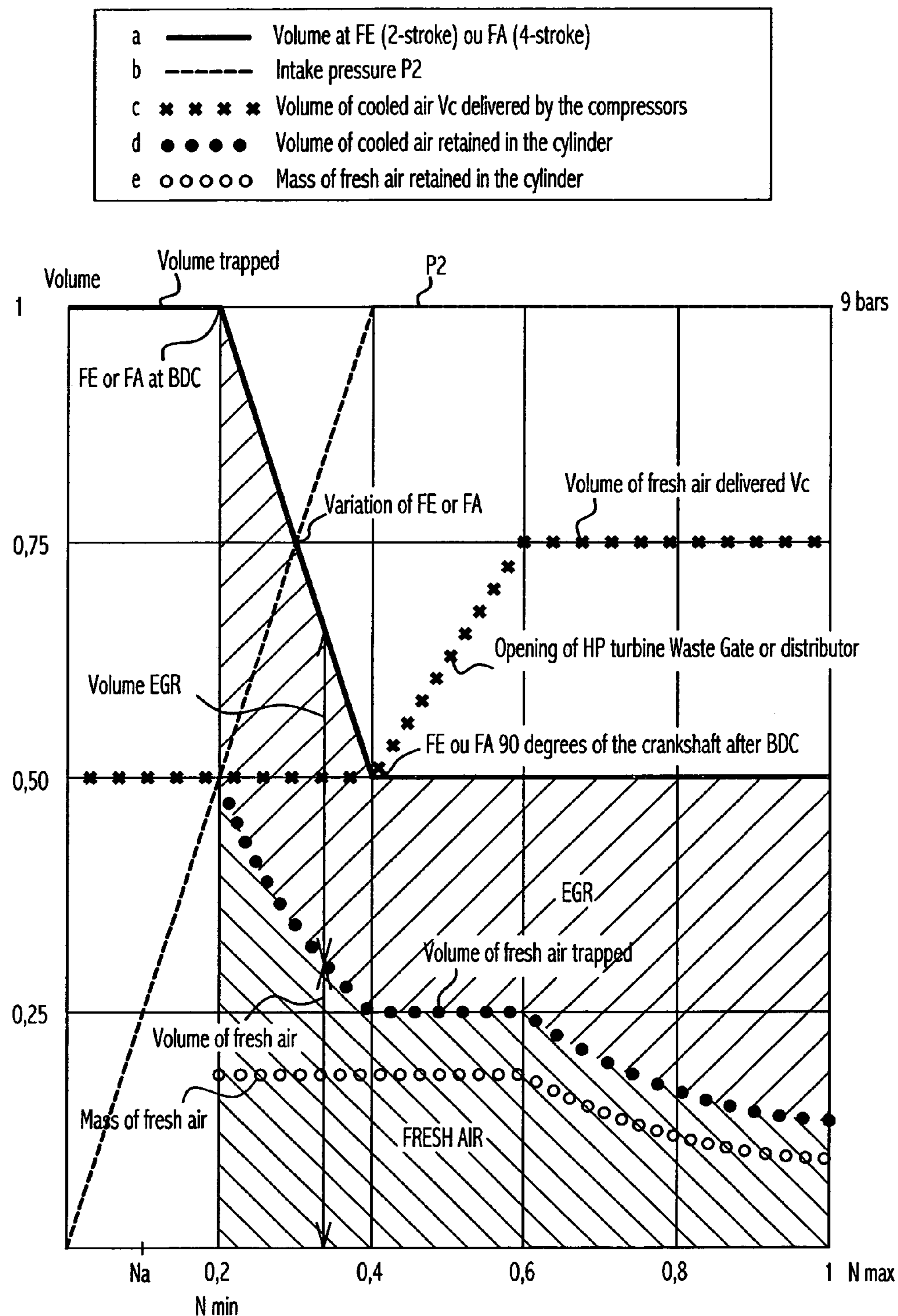
Figure 3A:
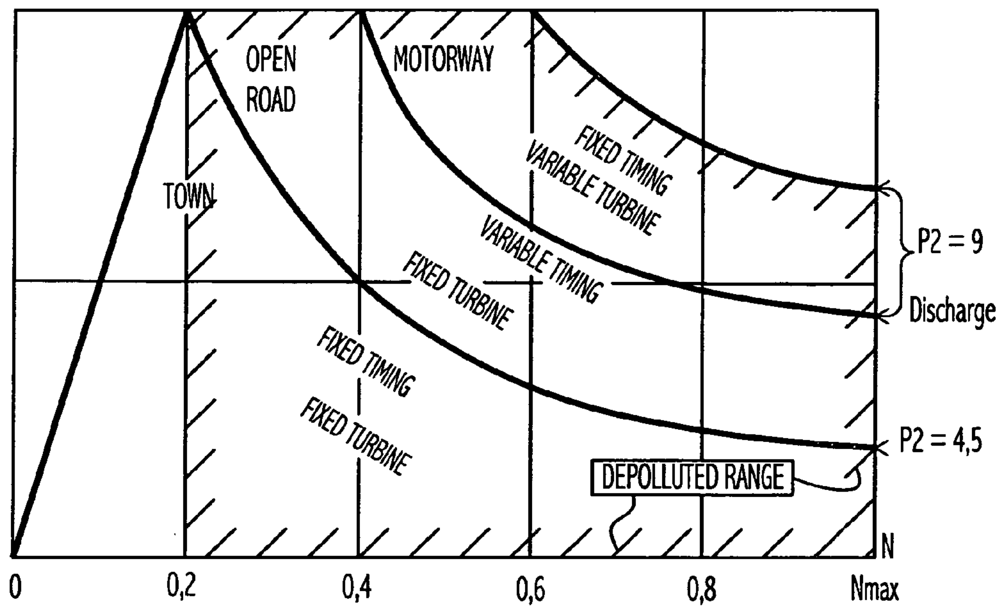
Figure 3B:
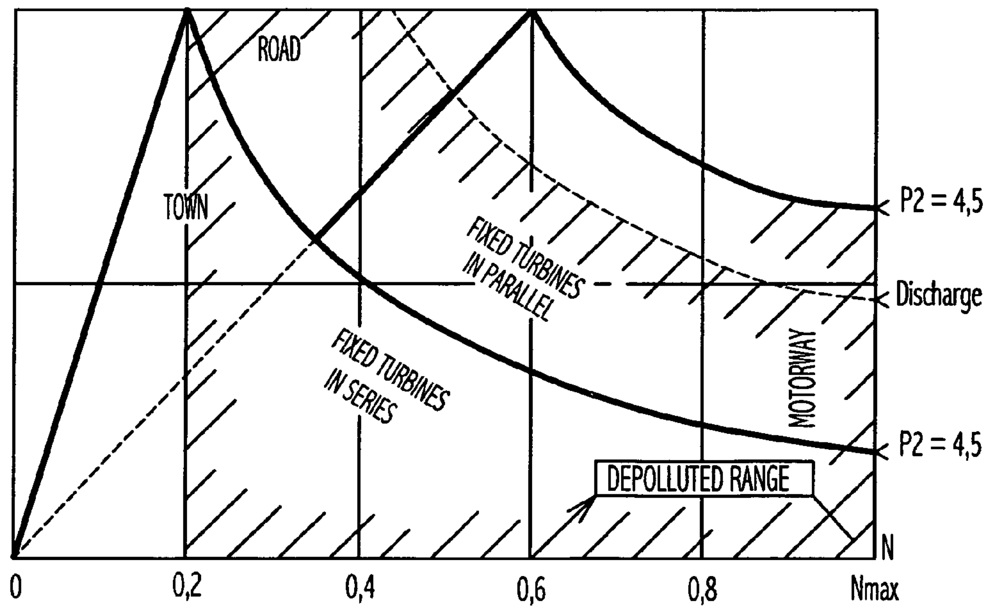
Figure 4:
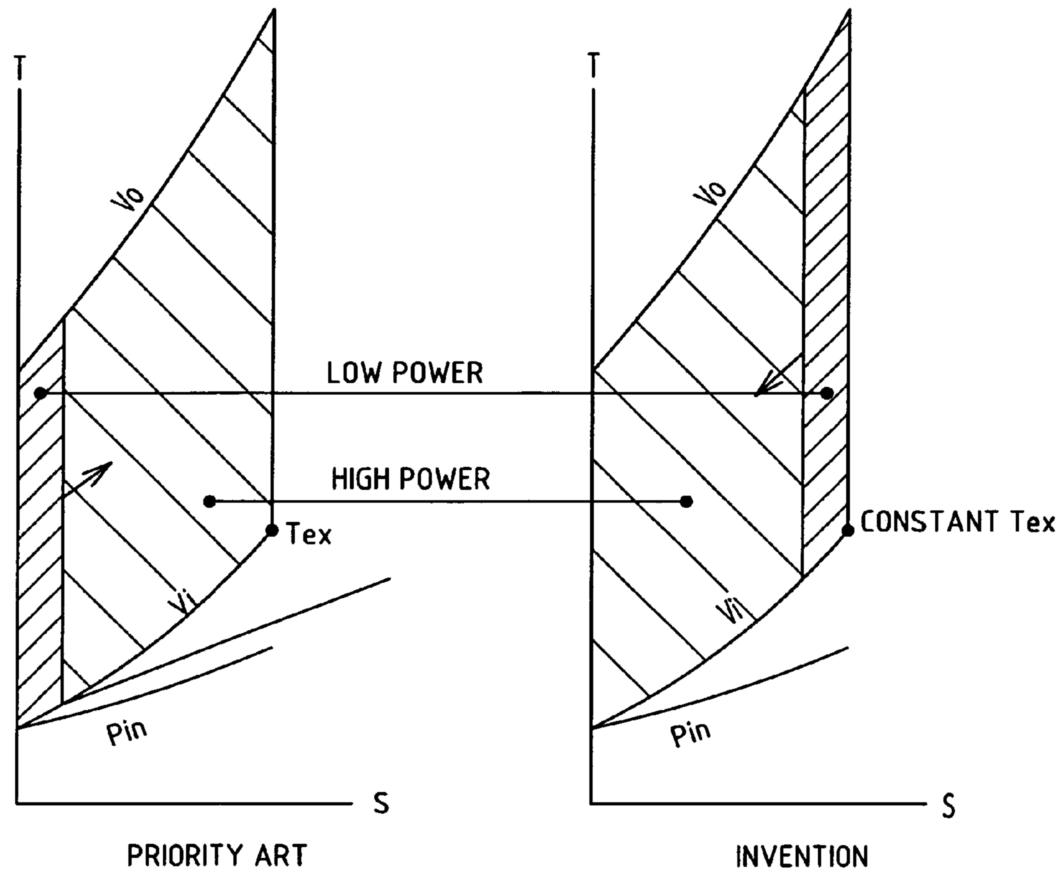
Figure 5:
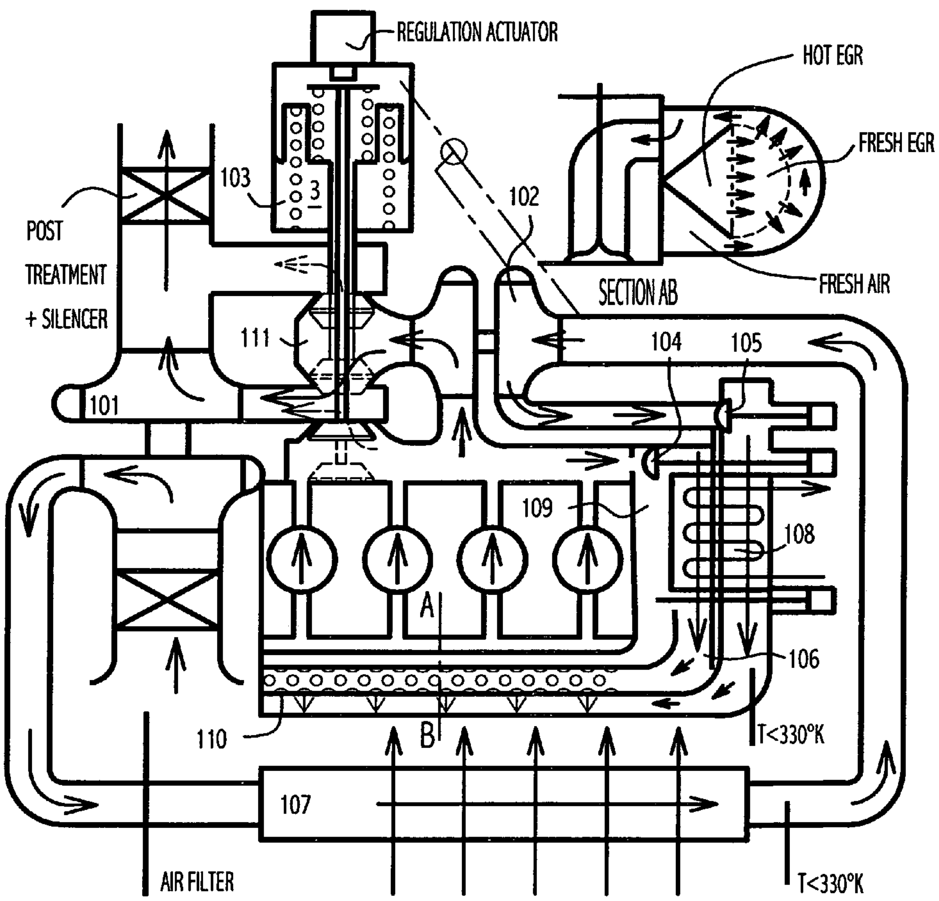
Figure 6:
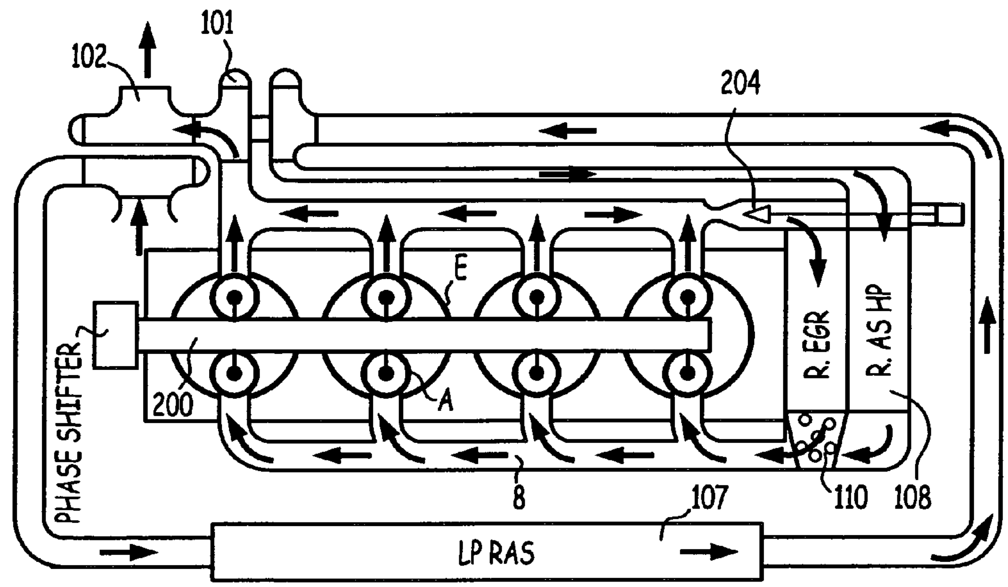
Figure 7:
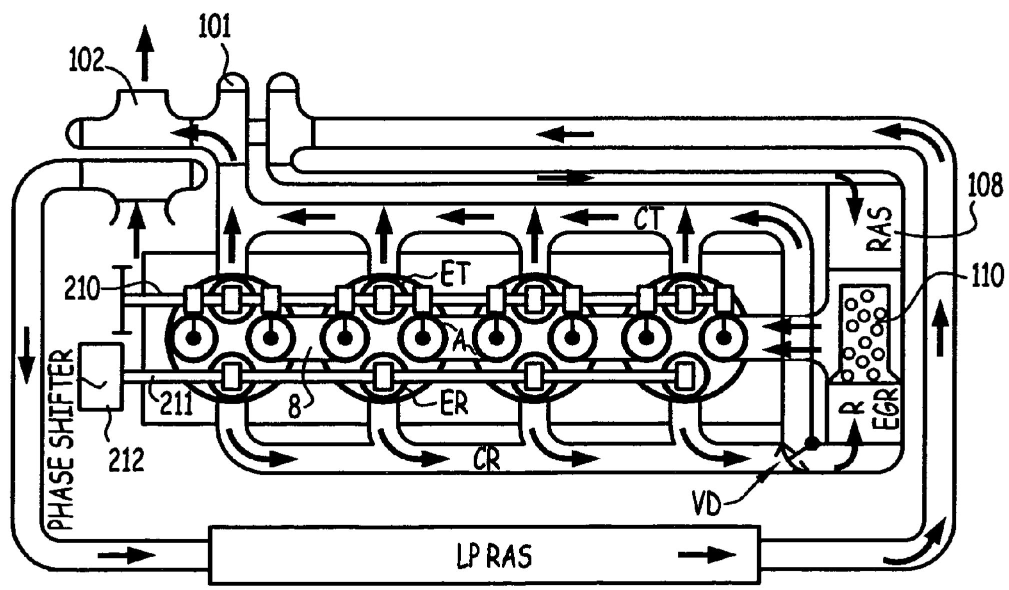
Figure 8:
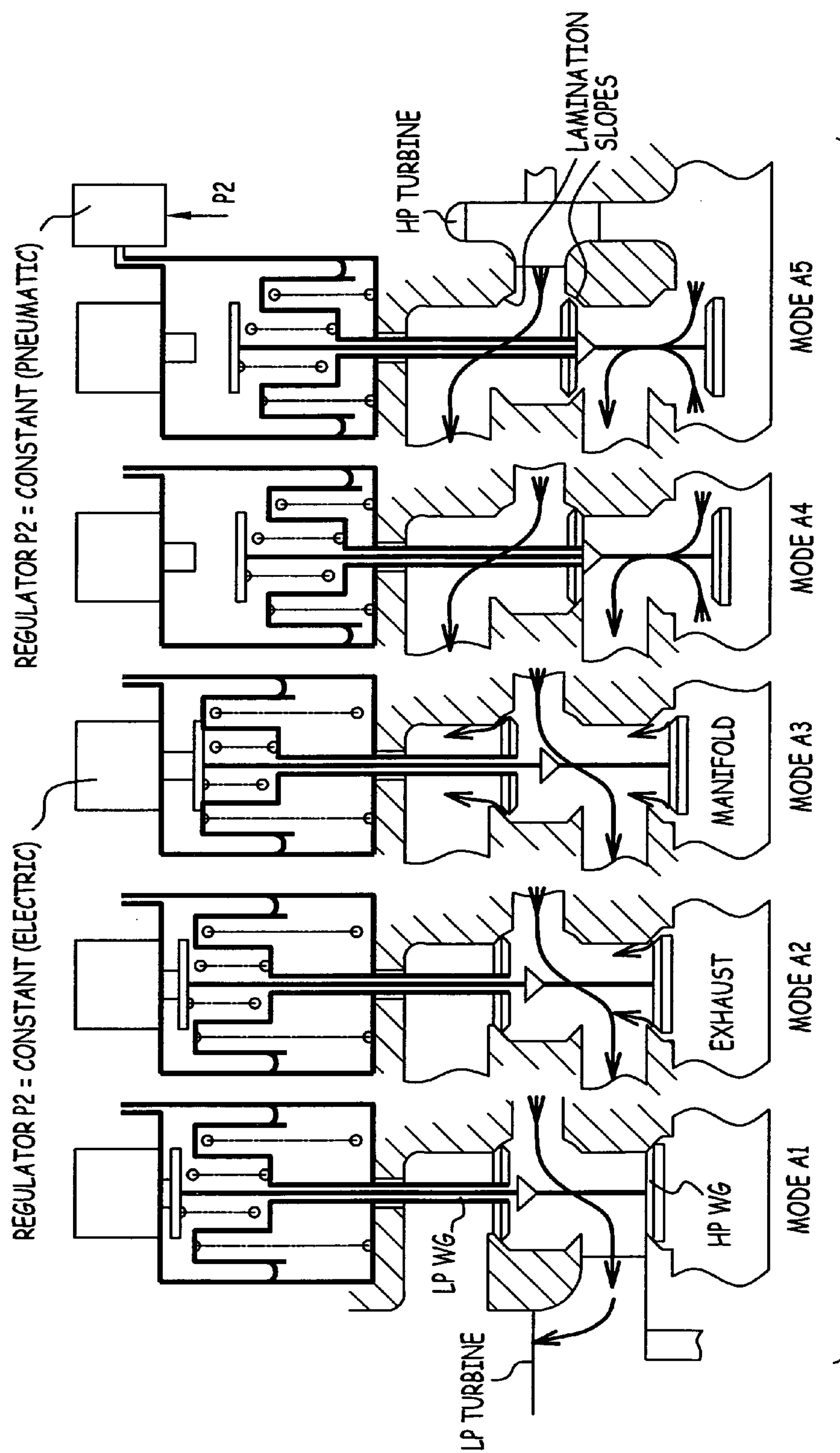
Figure 9:
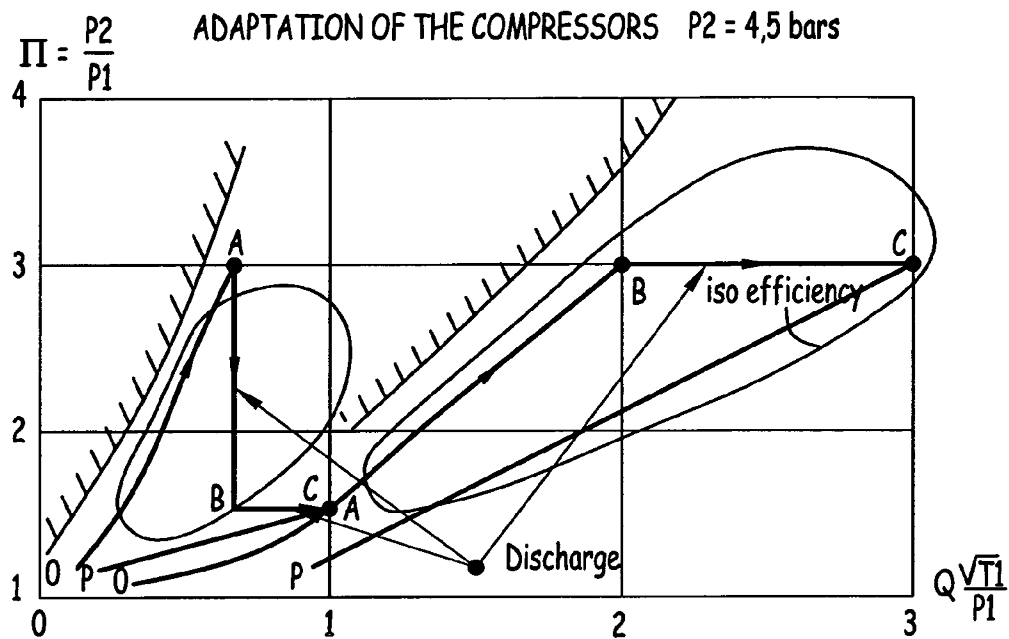
Figure 10:
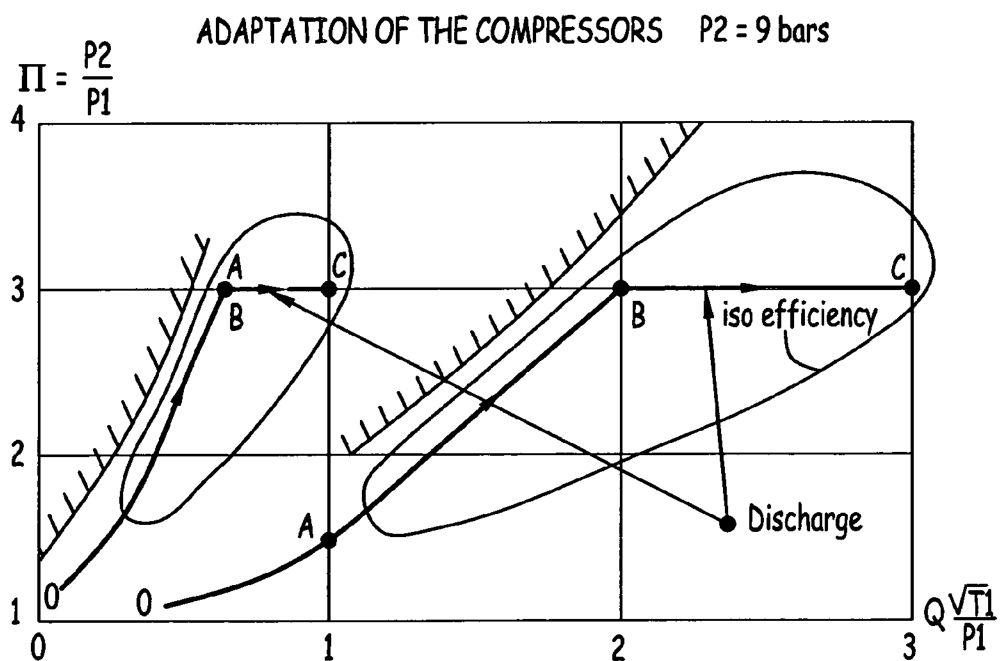
Figure 11:
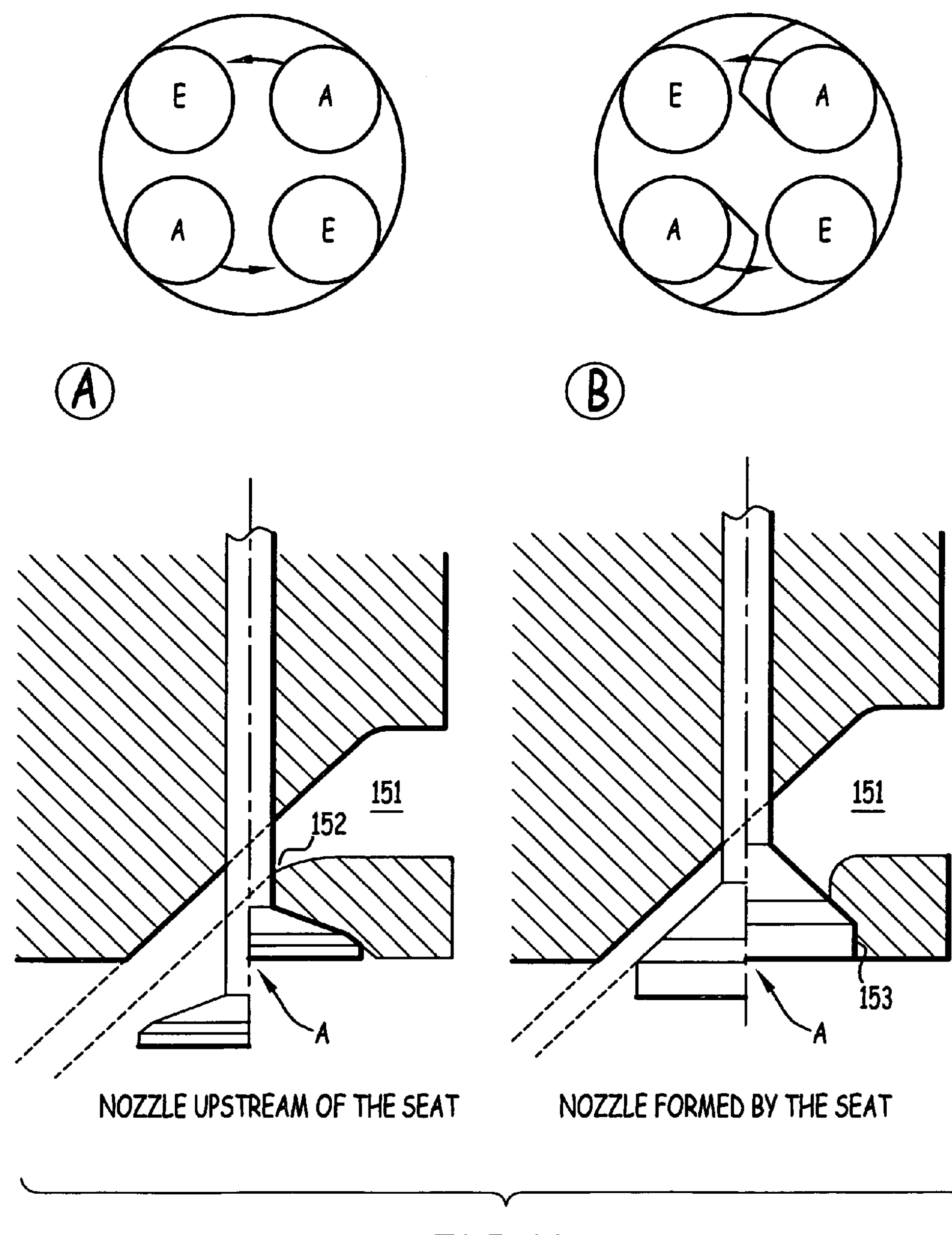

The description will now enumerate the principles of the invention and embodiments thereof with reference to the following figures:

FIG. 1 shows functional diagrams A, B, C of the engine supply structure,

FIG. 2 shows speed/volume diagrams of the transfers by variable timing of the valves and limited variation of the geometry of the turbines in an extreme case where the maximum torque is available at 20% of the maximum speed, FIG. 3 shows diagrams of embodiments of the invention with (3A) and without (3B) variable timing of the valves in the extreme case of FIG. 2, FIG. 4 shows the position of hot EGR cycles in the T/S diagram, FIG. 5 shows an example of the supply structure of a 4-stroke engine with fixed timing of the valves, FIG. 6 shows an example of the supply structure of a 2-stroke engine with variable timing of the valves and one single exhaust manifold, FIG. 7 shows an example of the supply structure of a 2-stroke engine with variable timing of the valves and with two exhaust manifolds, FIG. 8 shows a functional diagram of the double waste gate, FIG. 9 shows a diagram of adaptation of the compressors for the fixed timing of the valves, FIG. 10 shows a diagram of adaptation of the compressors for the variable timing of the valves, FIG. 11 shows two examples of a directive intake passage (A and B) for mixing the introduced gases and the residual gases and also for organising scavenging of the two-stroke cycle.

DETAILED DESCRIPTION OF THE INVENTION

1. The invention relates to a reciprocating engine used between a minimum speed of rotation Nmin and a maximum speed Nmax, which comprises a turbocharging unit dimensioned so as to function autonomously when:

it supplies the intake manifold of the engine with air via a coolant it is supplied with gas by the exhaust manifold of the engine the turbine supply pressure P3 is substantially equal to the compressor discharge pressure P2.

It is known that in these conditions, at constant air temperature and with a fixed geometry, the turbocharging delivers a substantially constant volume of cooled air Vc when the pressure varies.

It is also known that the volume Vc is substantially proportional to the turbine inlet section Sd offered to the hot gases.

In this engine according to the invention the turbine pressure P3 is maintained substantially equal to the compressor pressure by a bypass between the intake manifold and the exhaust manifold dimensioned so as to transfer the flow of exhaust gas to the intake manifold without significant loss of pressure, and the volume of air Vc is less than the volume drawn in by the engine at the speed Nmax in such a way that a flow of hot gases is drawn in again by the engine via the bypass above the speed Na where the volume drawn in is equal to –Vc, and a flow of air is deflected towards the turbine below the speed Na.

In the following, the bypass between the manifolds will be called the EGR conduit and the speed Na will be the turbocharging adaptation speed.

2. The engine according to paragraph 1. above can provide that the EGR bypass or conduit has a EGR valve making it possible to increase the turbine pressure above the compressor pressure.

3. The engine according to paragraph 1. above can provide that the turbocharging unit has an intake valve situated on the compressed air discharge conduit making it possible to increase the compressor pressure above the turbine pressure.

4. In an advantageous manner, the engine according to paragraph 1. can provide that the EGR conduit has a gas coolant at an adjustable temperature, preferably adjustable up to a temperature close to that of the fresh air.

5. This engine according to paragraph 2. above can provide that the adjustment of the temperature is effected by controlling a bypass of the coolant.

This general principle refers to FIG. 1.

6. A method of supplying an engine according to paragraph 4. above can provide that the EGR temperature is controlled to create the desired excess of air for the combustion in the engine.

7. This method of supply according to paragraph 6. can in particular have the feature that the EGR temperature is controlled so that the mass of the recycled gases remains substantially equal to the mass of the fresh air up to the speed at which this temperature returns to the exhaust temperature. Above this speed the recycled mass becomes greater than the mass of the fresh air.

8. This method of supply according to paragraph 6. can also have the feature that the EGR cooler is totally bypassed when the engine does not deliver propulsive power.

9. This method of supply according to paragraph 8. can in particular have the feature that for cold starting and operating at idling speed the adjustment of the turbine valves (6 and 7) and/or the timing of the engine valves is adjusted so that the excess of combustion air is minimal for the desired level of depollution.

These methods relate to different modes of controlling the bypass EGR according to whether it is required to optimize the smoke, the NOX, the noise or the pickup capacity of the engine.

10. The engine according to paragraphs 1. or 4. above can also have the feature that the adaptation speed Na is substantially equal to Nmin/2 so that the volume of recycled gases is at least equal to that of the fresh air, and the minimum temperature of the recycled gases is preferably close to the temperature of the fresh air so that the mass of the recycled gases is at least equal to that of the fresh air at the minimum speed used Nmin in order to depollute all the range of use of the engine.

11. The engine according to paragraph 1. can also have the feature that the turbocharging unit has a low-pressure LP turbocharger and a high-pressure HP compressor of which the compressors work in series with, preferably, a cooling of the air between the compressors and the exhaust section Sd can be adjusted between a minimum Sd min and a maximum Sd max by one or a combination of the following means:

adjustment of the variable section of the gas distributor of the turbines, opening of a bypass between the inlet and the outlet of the turbines, passage from a series configuration to a parallel configuration of the turbines.

The turbocharging adaptation speed Na thus becomes adjustable, in a continuous or discontinuous manner, between two values Na min and Na max.

In the following, a bypass between the inlet and the outlet of a turbine will be called a waste gate.

This structure refers to FIG. 5.

12. The engine according to paragraph 11. above can again have the feature that the minimum exhaust section Sd min offered to the gases is formed by the two turbines mounted in series at maximum closure if their distributor is variable and all waste gates are closed if they exist.

These methods relate to all the modes chosen in order to describe the invention.

13. The engine according paragraph 12. can be arranged so that it operates on a 4-stroke cycle and the timing of the valves is fixed.

14. The engine according to paragraph 13. can also have the feature that the maximum exhaust section Sd max offered to the gases is formed by two turbines with fixed distributors mounted in parallel.

In order to pass the turbines from the series configuration to the parallel configuration of the means permitting the following manoeuvres to be carried out successively:

progressive partial opening of the HP waste gate progressive and simultaneous partial opening of the HP and LP waste gates simultaneously and rapidly: total opening of the HP waste gate, total closure of the LP waste gate, putting the outlet of the HP turbine into communication with the outlet of the LP turbine.

15. The engine according to paragraph 13. can also have the feature that the maximum exhaust section Sd max offered to the gases is formed by a LP turbine with fixed distributor and a HP turbine with variable distributor mounted in parallel, the HP distributor being fully open.

In order to pass the turbines from the series configuration to the parallel configuration of the means permitting the following manoeuvres to be carried out successively:

progressive opening of the distributor of the HP turbine progressive partial opening of the LP waste gate simultaneously and rapidly: total closing of the LP waste gate and putting the outlet of the HP turbine into communication with the outlet of the LP turbine.

These methods relate to the mode designated A4 hereafter.

16. A method of supplying an engine according to paragraphs 2, 3. or 11. above can also have the feature that in order to limit the frequency of changing the configuration the geometry is immobilized for a type of driving which implements a limited power range, for example the series configuration for driving in town and the parallel configuration for driving on the open road, the power thresholds corresponding to each configuration can be crossed for manoeuvres of short duration, such as accelerating, overtaking, bursts of speed, etc.

The thresholds may be crossed as follows:

by closure of the EGR valve if the pressure in the exhaust manifold can be increased, by opening of one or two waste gates if the exhaust temperature can be increased, by closure of the intake valve if the maximum cycle pressure is reached or if the compressors are close to their maximum flow rate.

This method relates to the modes designated A1.1, A2, A3, B2, B4, C3, D3.

17. An engine according to paragraph 14. can also have the feature that the LP waste gate has a second seat in order simultaneously to effect the closure of the LP turbine inlet/outlet bypass and putting the HP turbine outlet into communication with the LP turbine outlet.

This method relates to the mode A4 below.

18. An engine according to paragraph 14. can also have the feature that the two waste gates are concentric and have stops in such a way that their simultaneous movements are actuated by one of them and communicated to the other by the said stops.

This structure refers to FIG. 8.

19. The engine according to paragraph 13. above can have the feature that the maximum exhaust section Sd max is formed by two turbines with fully open variable distributors mounted in series, and the distributors are opened simultaneously in order to maintain the intake pressure at its maximum desired value on the full load curve.

This very expensive solution has not been taken as an example. Nevertheless, it may be substituted for all the modes presented.

20. An engine according to paragraph 12. above can also have the feature that the timing of the engine valves can be controlled so as to displace the closure of the cylinder between the vicinity of the BDC and the mid-stroke of the piston, the maximum exhaust section Sd is formed by the HP turbine in series configuration with the distributor fully open if it is variable, the HP waste gate fully open in the contrary case, and the turbines are dimensioned so as to permit the compressors to reach their maximum pressure ratios simultaneously.

This relates to the modes B, C and D below.

21. A method of supplying an engine according to paragraph 20. above can have the feature that the full load curve as a function of the speed is as follows: from Nmin to 2 Nmin the intake closure Fa passes from the BDC (bottom dead centre) to approximately 90 degrees of the crankshaft after the BDC in such a way as to maintain the cycle pressure below its desired value. The distributor or the HP waste gate is closed, from 2 Nmin to approximately 3 Nmin the HP distributor or the HP waste gate is open and possibly the LP waste gate in order to maintain the intake pressure at its maximum desired value, FA (intake closing) is maintained at 90 degrees of the crankshaft after the BDC, from 3 Nmin to Nmax the global flow rate of fuel is kept constant in order to maintain the intake pressure at its limiting value, at partial load the timing of FA will be controlled according to a map memorized by the engine control computer.

This method described by FIG. 2 relates to the modes B1, C2, D2 below.

22. An engine according to paragraph 12. above can have the feature that it operates on the 2-stroke cycle, the intake ports are closed by valves, the exhaust ports are closed by valves and communicate with one single exhaust manifold, the external recycling phase precedes the scavenging, the timing of the valves can be controlled so as to displace the closure of the cylinder between the vicinity of the BDC and the mid-stroke of the piston, the maximum exhaust section Sd is formed by the HP turbine in series configuration with the distributor fully open if it is variable, the HP waste gate fully open in the contrary case, the turbines are dimensioned so as to permit the compressors to reach their maximum pressure ratios simultaneously, the EGR valve is replaced by a check valve or a closable aerodynamic diode.

23. A method of supplying an engine according to paragraph 22. above can have the feature that the full load curve as a function of the speed is as follows:

from Nmin to 2 Nmin the closure of the cylinder passes from the BDC to approximately 90 degrees of the crankshaft after the BDC in such a way as to maintain the cycle pressure at its desired value, the distributor or the HP waste gate is closed, from 2 Nmin to approximately 3 Nmin the HP distributor or the HP waste gate is open and possibly the LP waste gate in order to maintain the intake pressure at its maximum desired value, FA (intake closing) is maintained at 90 degrees of the crankshaft after the BDC, from 3 Nmin to Nmax the global flow rate of fuel is kept constant in order to maintain the intake pressure at its limiting value.

In order to maximize the cooled external EGR, the depolluted partial loads can be effected as follows:

the cylinder remains closed in the vicinity of the BDC and the turbines remain in closed configuration up to the P2 limit for this timing, the turbines are then opened in order to maintain P2 at its limiting value, the aerodynamic diode when the external recycling flow stops.

This method refers to FIG. 6 and relates to the modes C below.

24. An engine according to paragraph 12. above can have the feature that:

it operates on the 2-stroke cycle, it has two exhaust ports per cylinder, closed by valves, which communicate respectively with an exhaust manifold connected to the turbine and an exhaust manifold connected to the EGR conduit and/or to the turbine via a controlled distributor valve, the timing of the valve assigned to the EGR can be controlled so as to displace the closure of the cylinder between the vicinity of the BDC and the mid-stroke of the piston, the external recycling phase precedes the scavenging when the cylinder closes in the vicinity of the BDC and follows it when the cylinder closes at the mid-stroke of the piston, the maximum exhaust section Sd is formed by the HP turbine in series configuration with the distributor fully open if it is variable, the HP waste gate fully open in the contrary case, the turbines are dimensioned so as to permit the compressors to reach their maximum pressure ratios simultaneously, the EGR valve is replaced by a check valve or a closable aerodynamic diode.

25. The method of supplying an engine according to paragraph 24. above can have the feature that the pressure P2 is lower than the limit allowed for this timing, the distributor valve is in the recycling position, the cylinder is closed in the vicinity of the BDC, the distributor or the HP waste gate are closed, the pressure reaches the limiting value allowed for this timing, the closure of the cylinder is displaced to the mid-stroke of the piston in order substantially to double the allowed P2 limit, the distributor valve remains in the recycling position, the distributor or the HP waste gate remain closed, the pressure P2 reaches the new limit allowed for this new timing, the distributor valve blocks the recycling, the distributor or the HP waste gate open in order to keep the P2 at its new allowed limit, the transition can be made progressively in the two directions or rapidly with a hysteresis.

This method refers to FIG. 7 and relates to the modes D below.

26. The method according to one of the preceding modes can also have the feature that at full load the variable geometry is controlled so as to maintain a parameter at its limiting desired value, at partial load the variable geometry is controlled so as to optimize the depollution and/or the performance according to a map memorized in the engine control computer.

27. An engine according to paragraph 1. above, including a flat cylinder head bearing valves of which the faces on the chamber side are coplanar with the cylinder head and substantially tangent to the cylinder, can be such that the intake pipe or pipes terminate(s) by an oblong nozzle defined by an upper half-cylinder resting on the upper edge of the conical seat and tangent to this latter along its generating line situated in a plane substantially perpendicular to the plane passing through the axis of the seat and through the axis of the cylinder and through a lower cylinder covering half of the valve head opposite the said generating line.

The nozzles are also oriented so as to create a tangential air velocity in the same direction.

The angles of the seats are chosen so as to optomimize the stratification of the combustive charge.

28. An engine according to paragraph 1. above, including a flat cylinder head bearing valves of which the faces on the chamber side are coplanar with the cylinder head and substantially tangent to the cylinder, can be such that the conical sealing bearing surface of the intake valves is extended towards the piston by a cylindrical part of a height slightly greater than the lift of the said valves, that the conical seats of the said valves are disposed at the bottom of cylindrical recesses provided in the cylinder head in order to receive the said cylindrical parts of the said valves in such a way that the flat lower faces of the valves are in the plane of the cylinder head when they rest on their seats, the clearance between the recesses and the valves being minimal, that recesses are provided in the cylinder head which do not go beyond the following boundaries:

two cylindrical portions concentric with the bore and tangent externally and internally to the cylindrical recess of each valve, a conical surface extending the half-seat of the valve delimited by a plane passing through the axis thereof and the axis of the cylinder, the recesses will also be oriented so as to create a tangential velocity in the same direction, the angle of the seats is chosen so as to optimize the stratification of the combustive charge.

29. An engine according to paragraphs 27. or 28. above can have the feature that it includes two diametrically opposed intake valves.

These structures described in FIG. 11 relate to modes in which the residual exhaust gases are retained in the cylinder.

30. An engine according to paragraph 1. can have the feature that a fraction of the recycled gases is retained in the cylinder at the closure of the latter, the fresh gases are introduced by directive intake conduits with the aim of organizing a stratification of the temperatures and the concentrations in the chamber at the combustion top dead center, the fuel is vaporized in the fresh gases.

An advantageous solution for a radial stratification provides confining the combustion in a central bowl of small diameter which fills with the hot gases concentrated at the center of the cylinder during the compression whilst the carburetted mixture of fresh air is centrifuged in the peripheral space between the piston and the cylinder head until the start of its transfer into the bowl. If the richness of the carburetted mixture is situated between 60 and 70%, the flame initiated on contact of the hot gases present in the bowl will not propagate towards the peripheral fresh gases but will develop by turbulent mixing with the hot gases already present in the bowl. The excess of air present in all points of the chamber guarantees complete combustion without NOX or particles. The layer of carburetted air remaining in the clearance between the piston and the cylinder head which does not take part in the combustion in the bowl will be burned at the start of expansion or at the following cycle. The recirculated gases serve in this case to initiate and to maintain the combustion of a poor mixture during its turbulent transfer into the combustion bowl. The initial ignition can be ensured by an electric spark.

31. Such an engine according to paragraph 30. can also have the feature that the fuel is introduced into the pure air between the compressor and the external EGR mixer.

32. An engine, according to paragraph 30. can also have the feature that the fuel is introduced into the mixture between the pure air and the external EGR.

33. An engine according to paragraph 30. can also have the feature that the ignition point is controlled by the timing of the valves at the closure of the cylinder.

34. An engine according to paragraph 30. can also have the feature that the ignition point is controlled by the temperature of the external EGR.

35. An engine according to paragraph 30. can also have the feature that the first ignition is controlled electrically or is triggered spontaneously by the injection of the fuel at high pressure at the top dead centre.

36. An engine according to paragraph 30. can also have the feature that the working chamber of the gases has a geometry revolving around the axis of the cylinder, the stratification has a geometry revolving around the axis of the cylinder and created by the orientation of the intake ports, the temperature of the combustive charge increases between the periphery and the axis so that the self-ignition is propagated from the centre towards the periphery.

37. An engine according to paragraph 36. can also have the feature that the meridian profile of the combustion chamber is chosen so as to optimize the rate of heat release by the progressiveness of the isothermal surfaces of the reactive load.

These processes essentially concern engines with variable timing of the valves and particularly the 2-stroke cycles.

Reference will now be made to the diagram A of FIG. 1 which describes the functional diagram of the engine supply structure.

The engine 1, used between a minimum speed Nmin and a maximum speed Nmax, is supplied with gas at the temperature Tin and at the pressure Pin by an intake manifold 8.

After the combustion, it discharges the gas at the temperature T3 and at the pressure P3 into the exhaust manifold 9.

The manifolds 8 and 9 are connected to one another by a recycling conduit 3, dimensioned so as to be able to bypass all the exhaust gases discharged by the engine without significant pressure losses.

The recycling conduit 3 has a gas coolant 4, of the gas/water type for example, so as to be able to cool the recycled exhaust gases EGR to a temperature Tegr which is adjustable between T3 and a minimum temperature preferably close to the temperature of the cooling water.

The adjustment of the temperature will advantageously be effected by controlling a bypass of the cooler.

In this case a bypass can advantageously be used which short-circuits all or part of the cooling exchanger 4, as represented on the diagram B of FIG. 1.

The EGR conduit 3 has a valve 6 situated upstream or downstream of the cooler 4 and called the EGR valve.

The EGR conduit 3 is preferably connected to the intake manifold 8 via a mixer 5 so as to homogenise the combustive charge drawn in by the engine.

An intake valve (7) can be provided on the compressor discharge so as to increase the compressor pressure above the turbine pressure.

The assembly consisting of the engine 1 and the conduit 3 is supplied with fresh air at the pressure P2 cooled to the temperature T2 by a turbocharging unit 2, preferably via the mixer 5.

The turbocharging unit is actuated by the gases emitted by the assembly 1 and 3 at the pressure P3 and at the temperature T3.

The turbocharging unit 2 can include one or preferably two turbochargers with fixed or variable geometry, one or preferably two air coolers, one or several discharge valves called waste gates and an intake valve 7 to control the pressure P2 situated upstream or downstream of the last air cooler.

The unit 2 is supplied with atmospheric air by an air filter and discharges its gases into an exhaust line which can include post-treatments and silencers which generate a pressure loss.

In order to illustrate the depollution potential of the invention reference will now be made to FIG. 2.

This diagram describes the full load curve of a totally depolluted extreme engine which has its maximum torque at 20% of its maximum speed.

The turbocharging in series configuration is therefore adapted to half of this value, that is to say 0.1 Nmax.

The compressors deliver a maximum pressure P2 of 9 bars.

The outlet section Sd of the turbines varies only from 1 to 1.5.

The engine is provided with a variable timing of the valves which makes it possible to control the closure of the cylinder between the BDC where the pressure P2 is limited to 4.5 bars and the mid-stroke of the piston at 90 degrees of the crankshaft after the BDC where P2 is limited to 9 bars.

The unit of volume of this diagram is equal to the cylinder capacity and the unit of speed is the maximum speed.

All the curves represent the volumes of gas present in the cylinder at its closure except for the curve C which represents the variations of the total volume Vc of cooled air delivered by the unit 2 without taking into account the units. It should be understood that this volume flow is constant up to 0.4 Nmax, then increases linearly by 50% between 0.4 and 0.6 Nmax to remain at this value up to Nmax.

On this diagram, where the unit of volume is the cylinder capacity, Vc is therefore controlled from 0.1 to 0.15 Nmax for a two-stroke engine and from 0.05 to 0.075 Nmax for a 4-stroke engine, when the speed passes from 0.4 to 0.6 Nmax.

First of all the preferred modes of operation will be described in which the valve 6 and the valve 7 are fully open and in which Sd (outlet section offered to the exhaust gases) is fixed at its minimum value.

Under these conditions the turbine inlet pressure P3 is substantially equal to the compressor outlet pressure P2.

When P3 exceeds 2 bars, the sonic massic gas flow which passes through the turbines is proportional to P3 and inversely proportional to the square root of T3 which varies a little as a function of P3.

Moreover, if T2 is kept constant by the air cooler, the volume of cooled air Vc delivered by the unit 2 is substantially constant when P2 varies.

On the other hand, this volume is proportional to the outlet section Sd offered to the gases which expand in the turbocharging unit 2.

When the speed increases, the fraction of this volume retained in the cylinder (curve D) decreases in inverse proportion.

Calculations show moreover that the mass flow of fresh air is substantially proportional to the flow of burned fuel in the engine, which is itself proportional to the speed when the load is constant.

The volume of fresh air retained in the cylinder is therefore inversely proportional to the speed whilst the pressure P2 of this air is proportional thereto. This results in the remarkable fact that the mass of fresh air retained per cycle is independent of the speed and depends only upon the flow of fuel. Thus combustion takes place at a substantially constant richness.

This is a consequence of the stability of T3 imposed upon the engine by this type of turbocharging.

As the maximum torque must be reached at 0.2 Nmax, the trapped volume (curve A) is equal to 1 and the maximum level of fuel rate is reached at this minimum speed of use where P2 (curve B) has reached the limiting value of 4.5 bars for this trapped volume.

The volume of fresh air retained in the cylinder (curve D) is then half of the trapped volume, the difference being taken up by the cooled EGR at the temperature T2 in order to produce a recycled proportion by mass of 50%.

When N passes from 0.2 to 0.4 Nmax at the full rate of fuel, P2 passes from 4.5 bars to 9 bars. In order to comply with the maximum pressure of the cycle, the timing must be simultaneously modified in order to reduce the trapped volume to 0.5 when N=0.4 Nmax. As the volume of fresh air retained has undergone the same reduction by a half, the proportion by mass of EGR remained stable at 50%.

When N passes from 0.4 to 0.6 Nmax, P2 remains at its limit of 9 bars, the trapped volume remains at its minimum 0.5, the variable geometry of the turbocharging unit then takes over the variable timing of the valves in order to increase by 50% the volume of fresh air Vc and therefore its mass flow rate.

The mass of fresh air burned per cycle (curve E) therefore remains constant between 0.2 and 0.6 Nmax, the range where the maximum torque is available.

Between 0.6 Nmax and Nmax the torque decreases at constant power and the temperature of EGR must be increased to limit the proportion by mass of EGR to 50%.

Thus the totality of the range of use of the engine is depolluted by a proportion by mass of EGR of 50%.

Reference will now be made to FIG. 3 which compares in the MEP/speed field (the MEP is the mean effective pressure of the engine): the preceding modes of operation where the geometric adaptation is shared between the engine and the turbomachinery by successively exploiting the variable timing of the valves in order to adjust the volume Vm drawn in by the engine and the turbine section in order to adjust the volume Vc delivered by the compressor and the modes of operation with fixed timing of the valves where all of the geometric adaptation is effected by the turbine section Sd.

It will be seen that each geometric configuration makes it possible to reach all of the mean effective pressures and all of the speeds situated below the hyperbola of constant power corresponding to the maximum flow of air in its configuration.

These hyperbolae are also curves at maximum constant P2 in the configuration.

It is therefore advisable to choose P2 as parameter for controlling the geometry.

For example in the diagram 3A, if the maximum power is Wmax 3 depolluted modes of operation can be chosen.

W<0.33 Wmax which corresponds to town driving:

The timing of the valves and the turbine geometry remain fixed for the rapid transitions of urban driving.

Only the EGR temperature is regulated at high speed.

P2 varies with the power up to 4.5 bars.

0.33 Wmax<W<0.67 Wmax which corresponds to driving on the open road: the geometry of the turbines remains fixed, the timing of the valves is programmed as a function of P2, the EGR temperature is regulated at high speed, P2 varies from 4.5 to 9 bars.

0.67 Wmax<W<Wmax which corresponds to driving on the motorway: the timing of the valves is immobilised, a waste gate or a distributor opens to limit P2 to 9 bars, the EGR temperature is regulated at high speed, P2 remains constant at 9 bars.

The diagram 3B shows the 2 possible modes without any variable geometry by virtue of the series and parallel configurations of two turbines:

W<0.33 Wmax which corresponds to the depolluted driving in the town: the turbines are in series configuration, the turbine geometry remains fixed for the rapid transitions of urban driving, only the EGR temperature is regulated at high speed, P2 varies with the power up to 4.5 bars.

0.33 Wmax<W<Wmax which corresponds to partially depolluted driving on the motorway: the turbines are in parallel configuration, the geometry of the turbines remains fixed, the EGR temperature is regulated at high speed, P2 varies up to 4.5 bars.

The passage from one configuration to the other is explained in greater detail below:

Reference will now be made to FIG. 5 which describes a structure which is well adapted to the current engines with fixed timing of the valves and comprises:

- A small high-pressure (HP) turbocharger with fixed or variable geometry 102, supplying air to the intake manifold through an optional intake valve 105 and preferably a HP air cooler 108 to reduce the volume of air drawn into the engine. The HP turbine is always supplied by the gases coming from the exhaust manifold of the engine which it discharges into a conduit 111 which can communicate with the inlet and the outlet of the LP turbine as well as with the exhaust manifold.
- A large low-pressure (LP) turbocharger with fixed geometry 101, supplying air to the HP compressor, preferably through a LP air cooler 107 to reduce the work of the HP compressor. The LP turbine is supplied by the conduit 111.
- A double waste gate 103 comprising a HP waste gate and a LP waste gate, which are for example coaxial so as to be driven together, controlled so as to pass from the series configuration to the parallel configuration by passing if need be through a series/parallel configuration which can be actuated pneumatically by the pressure of the compressors for the rapid manoeuvres and by a hydraulic or electric actuator for the fine adjustments.

A conduit for recirculation of the exhaust gases connecting the exhaust manifold to the intake manifold through a gas cooler 109. This conduit is equipped with a controlled EGR valve 104 at its junction with the exhaust manifold and with a cooler bypass regulated by a controlled distributor flap 106. The combustive mixture is homogenized by the mixer 110 situated upstream or in the intake manifold.

The hot gases mix with the cold gases through the perforated partition of the mixer tube 110. The mixture obtained then mixes with the fresh air in the perforated partition of the mixer tube.

The compressors are dimensioned so as to be able to deliver at the pressure of 4.5 bars the volume of cooled air drawn in by the engine between 700 and 2100 rpm.

The HP turbine is dimensioned so as to receive, in series mode, the gases at 4.5 bars emitted by the engine when it turns at 700 rpm and it is supplied at 4.5 bars.

The LP turbine has a cubic capacity such that the two turbines mounted in series drive the compressors at their minimum volume flow (700 rpm, 4.5 bars) and that when mounted in parallel they drive the compressors at their volume flow corresponding to (2100 rpm, 4.5 bars), this being for a supply pressure of 4.5 bars and a temperature compatible with good combustion. These conditions are met when the capacity of the turbine is between 1.5 and 2 times that of the HP turbine.

This first structure is well adapted to modern engines. It has regulating valves, the control of which permits three groups of modes of operation of two turbochargers according to whether the engine is or is not equipped with a distribution with variable timing and whether it functions on the 2-stroke or 4-stroke cycle.

When the timing of the valves is variable, the parallel configuration is no longer necessary.

In the majority of cases, one single regulating device is active within one mode and no mode provides more than two simultaneous regulations.

This structure functions as follows:

When the timing of the valves is fixed, the turbines work in series mode in the depolluted range of low powers and in parallel mode in the range of high powers which are not subject to the legislation. The section Sd available for the evacuation of gases passes approximately from 1 to 3 between these two modes. The unevacuated fraction of the gases emitted by the engine is drawn in again via the recycling conduit.

In series mode the totality of the flow from the compressors passes through the two turbines and the HP turbine delivers a power greater than that of the LP turbine. The pressure ratios of the compressors are fixed by this power ratio.

In parallel mode each turbine receives a fraction of the flow from the compressors which is proportional to its outlet section. The HP turbine then delivers a lower power than that of the LP turbine which leads to a pressure ratio of the HP compressor which is lower than that of the LP one. A variable distributor of the HP turbine permits finer balance of the pressure ratios. It is also possible to throttle the inlet of the LP turbine to increase the gas flow through the HP turbine.

The transition can be made instantaneously in rapid manoeuvring of a double waste gate 103 between two sealing seats situated in the exhaust conduit 111 of the HP turbine, without loss of energy by throttling of the fluids. The transition is accompanied by a sudden variation in the gas pressures and in the speed of the turbochargers.

These discontinuities can be eliminated by two mixed series/parallel modes of transition controlled by the double waste gate represented in FIG. 8.

These mixed modes also permit considerable extension of the depolluted range.

The invention is also based on an original strategy of external recirculation of the exhaust gases:

The compressors always work in series with cooling of the air upstream and downstream of the high-pressure compressor. For example, according to the diagram C in FIG. 1, the cooler 4 is situated before the intake of the cylinder, on the intake conduit downstream of the mixer 5. In the following example the pressure delivered by the unit is limited to 4.5 bars.

The EGR conduit is dimensioned so as to create a small loss of pressure, when the EGR valve is open, in order to be able to impose an equality of pressure between the intake manifold and the exhaust manifold.

This solution reduces to a minimum the pumping losses in the depolluted phase. This solution concentrates the points of operation of the compressors on two lines OB and PC of the characteristic diagrams corresponding respectively to the series and parallel modes (FIGS. 9 and 10).

In mixed mode the routing in the diagrams is controlled by the double waste gate and the variable distributor of the HP turbine when this exists, as well as by the EGR valve.

The EGR conduit has a gas/water cooler and its controlled bypass which permits adjustment of the EGR temperature between the temperature of the fresh air and the exhaust temperature.

Only this mapped regulation is active in parallel and series modes, the EGR valve remaining fully open.

The adjustment of the bypassed fraction of a gas/water cooler, the walls of which remain close to the temperature of the water, permits precise programming of the intake temperature as a function of the speed, the rate of injection and if need be other parameters.

Programming has the advantage of avoiding the difficult measurement of a temperature which varies rapidly, a measurement which is necessary for looped regulation.

This structure also permits the control of the ratio between the outlet pressure of the compressors P2 and the supply pressure of the turbines P3:

| | |
|---|---|
| P3 = P2 = Pin | Valves 104 and 105 open |
| P3 > P2 = Pin | Valve 104 partially closed and valve 105 open |
| P3 = Pin < P2 | Valve 104 open and valve 105 partially closed |
| P3 > or < P2; P3 and P2 > Pin | Valves 104 and 105 partially closed |

It will be noted that all the preceding configurations permit recycling of gases since P3 is always greater than or equal to Pin.

The invention favours the modes where Pin=P3 in order to permit recycling of the exhaust gases while minimising the pumping losses.

The EGR valve 104 is only used in the 4-stroke cycle in order to extend the above modes for short periods and to avoid the frequent activation of the double waste gate 103.

The adjustment P3>P2 makes it possible to compensate for a lack of efficiency of the turbines at the expense of an increase in the pumping losses.

Reference will be made for example to the transitional speed between idling and clutch engagement, the accelerations in town and the bursts of speed.

Equally, the intake valve is only used in order to improve the positioning of the compressors in their characteristic diagrams in the vicinity of the maximum power or to reduce the maximum pressure of the cycle at the expense of a reduction in the EGR flow rate.

Therefore the essential in driving is effected with the EGR valve and the intake valve locked fully open.

For engines with fixed timing of the valves for which the maximum depolluted torque is situated at 25% of the maximum speed, the range of variation of the outlet sections is approximately from 1 to 3. The depolluted full load is therefore produced at constant torque up to 75% of the maximum speed and at constant power between 75% and 100%, which is perfectly suitable for the car propulsion.

The invention is also based upon a novel positioning of the partial load cycles in the temperature/entropy diagram T/S as shown in FIG. 4:

At very low loads with atmospheric intake, the prior art maximises the combustive mass whilst reducing the temperature thereof. These cycles situated to the left of the T/S diagram lead to exhaust temperatures which are too low to start the turbocharging which is only initiated above a minimum power.

This makes it difficult to pass from idling to breakaway conditions of the vehicle during clutch engagement when the quantity of air is insufficient to provide the desired torque.

When the power increases, the cycle is displaced towards the right of the T/S diagram in order to stabilise at the turbine/compressor balance point.

The present invention provides for the execution of the very low loads and the high speeds to the right of the T/S diagram by drawing in the hot exhaust gases with the addition of the quantity of air just necessary for combustion.

This strategy maintains a level of exhaust temperature which avoids cooling of the exhaust manifold and of the turbine casings on idling or during non-driven phases, cooling which retards the acceleration of the turbochargers during subsequent pickups.

It also improves the efficiency of the catalytic depollution.

Finally it makes it possible to reduce the effective compression ratio.

The operation without load in atmospheric intake is carried out at a high flow rate of hot EGR in order to maintain the thermal level of the reaction zone, the walls of the exhaust conduit and the catalytic post-treatments.

When the load increases from idling, priority is given to the establishment of the turbocharging, and the engine behaves as a generator of hot gases.

The EGR valve can be momentarily closed during the acceleration of the turbochargers in order to benefit from a pulsating pressure and to reach the turbocharged phase at the point of clutch engagement without EGR.

After the clutch engagement the flow rate and temperature of the EGR return to the selected programme for the depollution which preferably keeps the cycle on the right of the diagram T/S in order to minimise the response time on pickups.

In effect, the higher the speed of the turbochargers at partial load, the higher the excess of air available for the pickup.

Reference will now be made to FIGS. 3A, 3B, 9 and 10.

The invention has the advantage of the concentration of the points of operation of the compressors on the lines of their characteristic diagrams.

The diagram 3A describes three modes of operation in series configuration which are represented in the diagram 10:

all the points of town mode are on the segment OA, all the points of the open-road mode are on the segment AB, all the points of the motorway mode are on the segment BC.

The boundaries between the modes at constant P2 are respectively represented by the points A, B and C where the aerodynamic condition of the compressors is stationary.

Equally for the diagrams 3B and 9:

all the points of town mode are on OA, all the points of the open-road mode are on ABC, all the points of the motorway mode are on PC.

The flow of air delivered at 4.5 bars by the compression unit depends upon the positioning of the points of operation in the characteristic diagrams of the compressors. Good adaptation permits a variation of flow between 1 and 3 approximately. Such an adaptation involves precise management of the power of each turbine and of the outlet section offered to the exhaust gases.

The flow rate of the compressors is fixed by the outlet section of the exhaust system. It depends upon the pressure and the temperature of the gases.

In order to provide maximum reduction of the pumping losses, the present invention provides for operation principally with an exhaust pressure P3 equal to the intake pressure P2. Therefore the turbines are supplied at substantially constant pressure.

For a fixed geometry of the exhaust system, this relationship forces the compressors to operate on one single line of their operating diagrams.

As the pleasure of driving implies that the depolluted maximum torque should be available at 25% of the maximum speed, it will be seen that for P=4.5 bars the range of flow of the compressors corresponds to the range of speed at constant maximum torque between 12.5% and 37.5% of the maximum speed.

Between 37.5% and 100% the engine at full load can only function with a constant flow of air and therefore at constant power.

With fixed timing of the valves the 4-stroke engine draws in a volume proportional to the speed which becomes greater at double the volume delivered by the compressors above 25% of the maximum speed.

Reference is also made to the patent application WO02/48510, filed on 14 Dec. 2001 under the No. PCT/FR01/04006 claiming priority from French application 0016422 dated 15 Dec. 2000, and hereby incorporated by reference.

This application provides for the excess volume to be filled by expanding the compressed air by a lamination of the flow of air between the compression unit and the cylinders.

It provides for this expansion to be effected by lamination at the intake valves or by premature closure thereof.

The present invention provides for this expansion to be controlled by an intake valve situated at the outlet of the compression unit in order to be able to fill a fraction of the excess volume with fresh air under certain exceptional operating conditions.

Under normal conditions, the present invention provides for the excess volume to be occupied by the exhaust gases emitted by the engine via a conduit between the exhaust manifold and the intake manifold which is sufficiently permeable for the transfer to operate substantially at P2=P3. The depolluted range therefore extends over the entire range of speeds.

As the exhaust pressure is fixed, the flow from the compressors only depends upon the permeability of the exhaust system.

The present invention provides several solutions depending upon the extent of the range at constant pressure and the quality of the turbomachinery used. The following structures are cited in the order of increasing ranges by way of non-limiting example:

1) Turbines in series with waste gate on the HP turbine (1 to 1.8)

2) Turbines in series with variable distributor of the HP turbine (1 to 2)

3) Turbines in series/parallel with double waste gate between the turbines (1 to 2.4)

4) Turbines in series with variable distributors of the HP and LP turbines (1 to 3)

5) Turbines in parallel (1 to 3)

6) Turbines in series parallel with variable distributor of the HP turbine (1 to 4).

The invention also provides for extending the ranges above approximately by 30% by throttling of the recycling conduit if the exhaust manifold can support a pressure of 6 bars. Under these conditions P3=1.33 P2.

This extension is no longer realistic above 3, the flow rate range is essentially limited by the efficiency of the compressors at the maximum flow rate.

For engines with fixed timing of the valves, the invention favours the structures 3) and 6) which include the structures 1), 2) and 5).

The structure 3) benefits from the good efficiency and the simplicity of the turbines with fixed geometry.

The structure 6) permits a better series/parallel transition.

The volume of recycled gases depends upon the speed and the outlet section of the exhaust system.

At the maximum speed the recycled gases occupy 87.5% of the cylinder capacity for minimum Sd and 62.5% for maximum Sd.

For an exhaust temperature of 990° K. and a fresh air temperature of 330° K. the corresponding proportions by mass of uncooled EGR are respectively 70% and 37.5%.

The corresponding temperatures of the mixture drawn in are 518° C. and 304° C. It will therefore be seen that the rate of 50% at maximum Sd implies a cooling of the gases from 990° K. to 550° K. which gives an intake temperature of 167° C. after mixing.

The production of NOX decreases with the concentration of oxygen in the combustive mixture.

The present invention provides for operation principally with the concentration of oxygen and the richness which give the best compromise between NOX/particulates and the post-treatment used. It is therefore necessary to control the proportion by mass and the temperature of EGR according to the best NOX/particles compromise memorised in the map of the computer which controls the engine.

In the prior art the excess of air is adjusted by the exhaust section which acts on P2 and the proportion by mass of EGR by the EGR valve which acts on P3/P2.

The present invention, in which P3/P2 is principally constant, provides for acting on the temperature of the recycled gases.

Means are provided for cooling the recycled gases preferably to the temperature of the fresh air. Above a certain proportion by mass of EGR (approximately 50%) this cooling results in too much reduction in the enthalpy available for the turbines.

The invention then provides for limiting the energy dissipated in the EGR coolant by a controlled bypass of the said coolant.

For a given exhaust section, torque and speed, P2 increases and the recycling rate decreases when the EGR temperature increases. These two effects add up to increase the excess of air and the concentration of oxygen which are therefore linked by a relationship. Therefore the EGR temperature is an effective parameter for choosing the NOX/particulates compromise.

In order to simplify the adjustments and to optimise the use of the exhaust enthalpy, the present invention provides modes of operation with fixed exhaust geometry and without lamination of the flows.

Only the EGR temperature is controlled as a function of an imposed EGR map. This configuration will always give the best compromise between excess of air and fuel consumption for the chosen proportion of EGR.

For example, urban driving, where the accelerations and slowing down succeed one another at reduced power, is effected with turbines with fixed geometry working in series, controlling only the temperature of the gases drawn in again as a function of an EGR map.

The following description relates, by way of examples, to several modes of operation selected for driving in town, on the open road and on the motorway.

The list is not limiting.

Group A. 4-Stroke Engine with Fixed Timing of the Valves

The example with figures is the extreme engine of the diagrams 3A, 3B, 9 and 10.

Mode A1:

Depolluted urban driving.

Power<0.33 Wmax turbines working in series

Pin=P3<4.5 bars

N>0.2 Nmax

The double waste gate 103 is in the high position.

The intake valve 105 is fully open.

The EGR valve 105 is fully open in order to maintain the relationship Pin=P2=P3.

The guillotine 106 of the EGR cooler bypass is regulated.

The EGR cooler bypass programmes the intake temperature so as to obtain an EGR map which is fixed in advance, for example in the memory of the computer which controls the engine.

Under these conditions the compressors deliver a minimum volume of cooled air which reaches 4.5 bars, the volume drawn in by the engine at 0.1 Nmax. When the speed increases the engine makes this up by a volume of recycled gas which reaches 2 times the volume of air at 0.2 Nmax and 10 times at Nmax.

The adaptation curve OA of the compressors in the characteristic diagrams is indicated in FIG. 9.

The recycled mass fraction depends upon the temperature of the gases. In order to obtain 50% at 0.2 Nmax, it is necessary to cool the gases to the temperature of the air by closing (106) the EGR cooler bypass.

In order to maximise the enthalpy available for the turbines when the speed increases, it is necessary to increase the temperature of the recycled gases by progressively opening the guillotine 106 as a function of the speed, the quantity of fuel burned and the desired proportion of EGR.

The EGR bypass 106 is fully open for starting, idling and operation at very low load in order to maximise the thermal level in the combustion chamber so as to reduce the noise and the combustion residues and to maximise the speed and the temperature of the turbochargers in order to optimise their pickup capacity.

If necessary, the recycling rate at stabilised speed can be refined by a fixed or variable half-open position of the EGR valve 104.

As soon as the engine charges, the EGR valve opens totally and the guillotine passes to regulating the intake temperature which increases substantially from 60 to 450° C. when the speed increases from 0.2 Nmax to Nmax, the proportion by mass of EGR passing from 50% to 70%.

The range of operation over this depolluted mode, which only implies the continuous control of the single guillotine 106, is the city zone of the MEP/speed diagram 3B. It covers the totality of driving in town where the variations of speed are frequent. The absence of discontinuity presents a certain advantage in this context.

The chart of intake pressures and temperatures in the range is a function of the map introduced into the engine control computer for controlling the guillotine 106.

The upper limit of the range corresponds to the limiting pressure for intake and exhaust which is fixed here at 4.5 bars.

Within this mode, the adaptation of the turbochargers can be slightly modified by partially closing the EGR valve 104 in order to have P3/P2>1. This may prove necessary in order to improve the clearance on surge of the compressors which is very small in this mode.

The power reachable on this mode can be increased by closing the EGR valve (104) so that P2=4.5 bars and P3>4.5 bars. The limit of this extension is the P3 allowed by the technology of the exhaust manifold.

This mode of extension is simple and increases the excess of air to the detriment of the fuel consumption. It is therefore of interest in urban driving where the increased power is little used and where the transient operation lasts a short time.

The passage from P3=4.5 bars to P3=6 bars makes it possible to increase by 30% the range covered by the mode A1 under the following conditions.

Reference will now be made to FIG. 8 which describes the operation of the double waste gate.

Mode A11:

Depolluted accelerations in town.

Power between 0.33 and 0.44 Wmax.

turbines working in series

Pin=4.5 bars 4.5 bars<P3<6 bars

N>0.27 Nmax

The double waste gate 103 is in the high position.

The intake valve 105 is fully open.

The EGR valve 104 is regulated to maintain Pin=4.5 bars.

The EGR cooler bypass 106 programmes the intake temperature so as to obtain an EGR map which is fixed in advance, for example in the memory of the computer which controls the engine.

Mode A12 turbines working in series

Pin=4.5 bars

N>0.25 Nmax

Mode A2: Extension of the Mode A1 Limited by the Flow Rate of the Turbines Depolluted road driving Power between 0.33 Wmax and 0.5 Wmax turbines working in series parallel regulated by the HP waste gate alone.

Pin=P3=4.5 bars.

The double waste gate 103 is in the high position.

The EGR valve 104 is fully open.

The intake valve 105 is fully open.

The guillotine 106 is programming the intake temperature.

The HP part of the waste gate is half-open to maintain P2=P3=4.5 bars.

Reference will now be made to FIG. 8.

In order to fix ideas, we will now depart from the boundary of the mode A1 where the initial conditions are as follows:

P2=P3

The pressure between turbines P4=2 bars

The compressors are at the points A of their diagrams.

Output of the compressors=Q.

When the HP waste gate opens progressively to regulate P2=P3=4.5 bars until contact with the LP waste gate, the output of the compressors increases to increase the power delivered by the engine.

During this manoeuvre the exhaust temperature T3 is increased to compensate for the energy dissipated by throttling; the pressure P4 between turbines is passed from 2 to 3 bars approximately; the total output of the compressors has passed through the LP turbine, the expansion rate of which is passed from 2 to 3. Therefore the output of the compressors has passed from Q to 1.5 Q and their points of operation have moved from A to B; the power of the HP turbine has decreased when its expansion rate has moved from 2.25 to 1.5; the LP compressor has accelerated and the HP compressor has decelerated to a point where the flow rate no longer increases.

Mode A3: Extension of A2 Limited by the Exhaust Temperature

Depolluted road driving

Power between 0.5 Wmax and 0.8 Wmax turbines working in series parallel regulated by the HP and LP waste gates controlled simultaneously.

Pin=P3=4.5 bars.

The double waste gate 103 is in the high position.

The EGR valve is open.

The intake valve is fully open.

The guillotine 106 is programming the intake temperature.

The HP and LP waste gates are half-open to maintain P2=P3=4.5 bars.

When the flow of fuel continues to increase, the two valves of the double waste gate supported against one another open simultaneously to maintain P2=P3=4.5 bars.

The throttling slopes (see FIG. 8) of the waste gates on this part of their travel determine the development of the pressure between turbines P4 during this phase.

P4 determines the points of operation of the compressors in their diagrams. The slopes will be defined for progressive routing between the points B and C. Let us accept for the sake of simplicity that this routing leads to P4=2.7 bars.

During this manoeuvre, the temperature T3 is still increased in order to compensate for the energy dissipated in the discharge of the LP waste gate. The gas flow of the two turbines has not changed substantially. The air flow of the compressors has increased by the discharge of the LP waste gate limited by the maximum permissible T3. Let us fix this flow at 2.4 Q at the point C.

If T3 exceeds the limiting value imposed by the richness, it is possible to act on the EGR valve in order to increase P3 and to decrease T3.

This mode of operation can be carried out with two turbochargers equipped with conventional waste gates which limit the pressure delivered by the compressor. It would be possible to set the HP waste gate to 4.5 bars and the LP waste gate to 2.5 bars for example. This method positions the LP compressor on a horizontal in its characteristic diagram.

Transition Between the Mode A3 and the Mode A4

The initial conditions of the transition are constant on the A4/A2 boundary. To aid understanding of the description they are fixed as follows:

P2=P3=4.5 bars

HP and LP waste gates at maximum discharge.

P4=2.7 bars.

Compressors flow=2.4 Q

LP turbine flow=1.5 Q

HP turbine flow=0.75 Q
LP expansion ratio=2.75
HP expansion ratio=1.64

The final conditions of the transition are as follows:

P2=P3=3 bars
Compressors output=2.4 Q
N turbo HP unchanged
LP turbine flow=1.6 Q
HP turbine flow=0.8 Q
LP expansion ratio=3
HP expansion ratio=3

The transition is effected by the rapid and simultaneous rocking of the waste gates to the lower seat of the LP waste gate. This manoeuvre is programmed on the limiting T3 curve. In order to prevent the engine from stabilising on the transition, the rocking line A2/A5 will be different from the rocking line A5/A2.

During this manoeuvre, the P2 and P3 move from 4.5 to 3 bars. The flow of the compressors remains unchanged, the EGR flow rate decreases, the flow of the turbines varies little, the BP expansion ratio varies from 2.75 to 3, the HP expansion ratio moves from 1.64 to 3, the speed of the LP turbo increases slightly, the speed of the HP turbo decreases slightly.

Direct Transition Between the Mode A1 and the Mode A4

This will take place by a brief passage through A4 and A5 to limit the discontinuities.

Mode A4

Economical, slightly depolluted driving on the motorway
Power between 0.33 Wmax and Wmax
turbines working in parallel
Pin=P3<4.5 bars
N>0.35 Nmax The double waste gate 103 is in the low position.

The intake valve is fully open.

The EGR valve 104 is fully open to impose the relationship P2=P3

The EGR cooler bypass programmes the intake temperature so as to obtain an EGR map which is fixed in advance, for example in the memory of the computer which controls the engine.

The compressors operate on the adaptation curve PC of FIG. 9 with a different distribution of the pressure ratios due to the fact that the powers developed by the turbines are in the constant ratio of their permeabilities.

The range covered by this mode is the motorway zone of the diagram 3B. As for the preceding mode, its upper limit corresponds to the limiting intake and exhaust pressure fixed at 4.5 bars. It covers the essential of economical driving on the motorway without discontinuity of operation.

This mode with a high expansion ratio of the two turbines permits post-treatments with high pressure loss.

Group B: 4-Stroke Engines; Variable Timing of the Valves

The group A brings together the processes where the variable geometry is situated at the level of the turbocharging unit in order to adjust from 1 to 3 the volume Vc of cooled air delivered by the compressors at a pressure limited to a desired value of 4.5 bars imposed by the high compression ratio of the engine.

As has been stated previously, the control of the timing of the valves makes it possible to adjust, from 1 to 2 approximately, the volume drawn in by the engine at a given speed by positioning FA (closure of intake) at the mid-stroke of the piston and FE (closure of exhaust) at the TDC.

The reduction in the trapped volume is accompanied by a reduction in the compression ratio which makes it possible to double the desired pressure value to 9 bars.

Furthermore, an adjustment from 1 to only 1.5 of the volume Vc makes it possible to cover all the range of speed in series configuration and to avoid the series/parallel discontinuity (FIG. 10).

In a 4-stroke cycle the volume of air drawn in is substantially the difference between the total volume of gases present in the cylinder defined by the volume of the chamber at FA and the volume of residual exhaust gases defined by the volume of the chamber at FE.

The recycling mechanism can then be broken down into a hot internal recycling and a cooled external recycling, the mixture being produced in the interior of the cylinder. The proportion between the hot EGR and the cold EGR can be controlled by the timing of the valves.

Therefore the control of FE is another means for adjusting the volume drawn in by the engine without modification of the compression rate.

The reduction of the NOX involves a reduction in the temperature during combustion which starts at the compression finishing temperature. It is therefore favourable to minimise the compression ratio and the EGR temperature.

Moreover, the triangular loss of cycle which accompanies the Joule expansion upon opening of the exhaust valve can be recovered by two turbines in series which undertake part of the compression work of the piston.

In order to maximise the torque at low speed and to facilitate cold starting, FA must occur in the vicinity of the bottom dead centre of the piston in order to maximise the volume trapped at low speeds.

In order to increase the intake pressure whilst complying with the pressure limit in the cylinder, it is therefore necessary to reduce the effective compression ratio by advancing or retarding FA.

The simplest means is to retard FA by accepting the reflux of part of the air drawn in by the intake manifold.

Two compressors in series deliver naturally a pressure proportional to the engine power which can reach 8 to 10 bars at full power.

If the maximum intake and exhaust pressures move for example from 4.5 to 9 bars, the range in mode A1 is doubled at the expense of a high-pressure technology for the HP conduits facilitated by the reduction by 50% of the ports sections.

The FA timing must therefore move from 20 to 90 degrees of the crankshaft approximately in order to divide the trapped volume by 2.

This strategy makes it possible to operate the compressors over the restricted range from 1 to 1.5 where the efficiency can be optimised in order to tolerate a bypass rate of the HP turbine close to 30% at full power.

Under these conditions the extended mode A1 covers the totality of the range of the modes A2, A3 with a total depollution rate and regulation limited to control of the EGR bypass and of the angle of FA.

The HP waste gate can be operated as a simple pressure-limiting valve.

This mode B1 and its extension differ from the mode A1 and its extensions by the control of FA which adjusts the volume of EGR for each speed of the engine and therefore the pressure P2.

The control of FA can be substituted for the control of the EGR cooler bypass which adjusts the EGR temperature. Nevertheless, retaining the controlled bypass has the following advantages:

Maintaining the mode A1 when P2<4.5 bars in order to avoid the phase shift of the camshaft in the rapid transitions of urban driving, and FA can then be controlled more slowly at high power in order to limit the cylinder pressure when P2>4.5 bars.

Possibility of programming two or three fixed values of the FA angle and of maintaining the regulating function of the controlled bypass.

Maintaining the hot EGR at very low power.

Reduction in the ignition delay at very late FA where the effective compression ratio is very low.

Mode B1: Extended Mode A1 is Substituted for A2 and A3

Depolluted driving in town and on the open road.

Power between 0.33 Wmax and 0.67 Wmax.

turbines in series 4.5<Pin=P3<9 bars

FE at TDC

Intake closure programmed to limit the cylinder pressure

N>0.2 Nmax

The double waste gate 103 is in the high position.

The intake valve 105 is fully open.

The EGR valve 104 is full open to maintain Pin=Pex (P2=2 P3).

The guillotine 106 is regulated.

The EGR cooler bypass programmes the intake temperature so as to obtain an EGR map which is fixed in advance, for example in the memory of the computer which controls the engine.

The angle of FA is controlled in discontinuous or continuous manner to limit the maximum pressure in the cylinder.

Mode B2: Extended Mode B1 External EGR Only

Depolluted driving on the motorway

Power between 0.67 Wmax and Wmax.

turbines in series/parallel

Pin=P3=9 bars

FE at TDC

FA at mid-stroke

N>0.4 Nmax

The double waste gate 103 is in the high position.

The intake valve 105 is fully open.

The EGR valve 104 is fully open to maintain the relationship Pin=Pex (P2=P3).

The EGR cooler bypass programmes the intake temperature so as to obtain an EGR map which is fixed in advance, for example in the memory of the computer which controls the engine.

FA remains in the retarded position.

The HP waste gate is half-open in order to maintain P2=P3=9 bars.

The usual device for variable distribution consists of a controlled phase shift of the camshafts which generally control two valves per shaft.

The phase shift of a valve therefore involves the same phase shift on another valve, the effect of which is negligible in the vicinity of the dead centres of the pistons.

For example, the variation of FA alone is possible for a cylinder head with 4 valves and two camshafts which activate an intake valve and an exhaust valve respectively with the following diagrams:

A fixed camshaft controls the opening of the intake phase as well as the opening and the closure of the exhaust phase with for example: (R=retard, A=advance, O=opening, F=closure, 1=fixed camshaft, 2=phase-shiftable camshaft). The values are in degrees of the crankshaft.

| | |
|---|---|
| ROA1 = 0 | AOE = 20 |
| RFA1 = 20 | AFE1 = 0 |

The other phase-shiftable camshaft controls only the closure of the intake phase with for example:

| | |
|---|---|
| P2 < 4.5 bars | |
| ROA2 = 0 | AOE2 = 20 |
| RFA2 = 20 | AFE2 = 80 |
| P2 = 9 bars | |
| ROA2 = 80 | AOE2 = −60 |
| RFA2 = 100 | AFE2 = 0 |

Mode B3: Extended Mode A1. External and Internal EGR. Substituted for B2

Variable intake closure, exhaust closure and intake opening.

turbines working in series 4.5<P2=P3<9 bars

The double waste gate 103 is in the high position.

The intake valve 105 is fully open.

The EGR valve 104 is fully open to maintain the relationship Pin=P2=P3.

The EGR cooler bypass 106 is closed or eliminated.

The hot internal EGR is controlled by FE.

The cooled external EGR is controlled by FA.

OA occurs approximately when the cylinder pressure crosses Pin.

FA is controlled to limit the maximum pressure of the cycle.

The FA delay is accompanied by a delay equal to OA which occurs 80 degrees after the TDC at high speed. In order to avoid pumping losses it is necessary simultaneously to advance FE in order to retain the hot gases of which the pressure crosses the intake pressure at OA.

The combustive mixture is produced in the cylinder during filling with a possibility of stratification described in U.S. Pat. No. 5,517,954, which is hereby incorporated by reference.

The intake valve or valves is/are actuated by a phase-shiftable intake camshaft.

The exhaust valve or valves is/are actuated by a second phase-shiftable exhaust camshaft.

The proportion of hot EGR is controlled by FE.

The complement of cold EGR is controlled by FA.

The phase shifters are actuated according to a map of the proportions of hot and cold EGR.

If the exhaust section is undersized the pressure at the TDC crossing increases naturally with the speed of the pistons. Therefore a more reduced phase shifting of the exhaust shaft will be sufficient. It would be possible to choose for example:

| | |
|---|---|
| P2 = P3 < 4.5 bars | |
| ROA = 0 | AOE = 0 |
| RFA = 20 | AFE = 25 |
| P2 = P3 = 9 bars | |
| ROA = 80 | AOE = 30 |
| RFA = 100 | AFE = 55 |

Thus part of the gases is retained in the interior of the cylinder and the mixing with the cold gases is effected during the filling stage with a possibility of stratification.

The exhaust phase shift is then substituted for the coolant bypass in order to regulate the EGR temperature.

These cycles which present a recompression of the gases at the TDC crossing can create problems of lubrication of the axle of the piston well known on the two stroke engines.

Mode B4: Extended Mode B2 or B3 turbines in series/parallel

P2=P3=9 bars

The double waste gate 103 is in the high position.

The intake valve 105 is fully open.

The EGR valve 104 is fully open to maintain P2=P3.

The EGR cooler bypass 106 is closed or eliminated.

FA remains in the retarded position.

FE is retarded to reduce the internal EGR when the flow of fuel increases.

The HP waste gate is half-open to maintain P2=P3=9 bars.

Mixing of the Hot EGR and the Fresh Gases in the Cylinder

The methods of supply which leave residual exhaust gases after the closure of the cylinder have the advantage of permitting a stratification of the temperatures and of the concentrations in the combustion chamber.

This advantage is exploited by the invention described in U.S. Pat. No. 5,517,954 in order to reduce the ignition delay of diesel engines with a low compression ratio of which the ignition point is adjusted by direct injection of the liquid fuel at high pressure.

U.S. Pat. No. 5,517,954 is incorporated herein by reference for obtaining the stratification.

Processes have recently appeared for combustion in a homogeneous pre-mixture wherein the fuel is vaporised in the combustive charge before or during the compression phase which precedes the combustion in the cylinder, such as engines with spark-controlled ignition.

These novel processes are distinguished by the fact that the self-ignition is triggered by the heating due to the compression.

The pitfall of these solutions is the explosive tendency of the simultaneous self-ignition in all points of a volume of the combustion chamber.

The present invention makes it possible to control the supply of the engine with fresh air, cooled external EGR and uncooled internal EGR in order to create a stratification of the temperatures and concentrations in the chamber at the combustion top dead centre.

For engines in which the fuel is vaporised in the combustive charge before or during the compression, the invention provides for organising this stratification so that the self-ignition by compression extends progressively from the hot zones towards the cold zones of the combustion chamber when the pressure of the gases increases.

Thus the simultaneous self-ignition relates to the isothermic surfaces of the reactive load and no longer to the explosive volumes.

The rate of instantaneous heat release is proportional to the value of the surface in the course of self-ignition and to the concentration of fuel vapour on this surface.

In addition to the gradients of temperature and of concentration, therefore, geometric parameters of the combustion chamber are available in order to adjust the progressiveness in the energy release process.

The ignition point is advantageously controlled by the crankshaft angle upon closure of the cylinder which simultaneously adjusts the quantity of hot gases recycled and the effective compression rate which brings them to the self-ignition temperature.

Another way of controlling the ignition point is the EGR temperature.

The fuel can be vaporised in the pure air between the compressor and the external EGR mixer for precise adjustment of the richness of the reactive load.

The fuel can also be introduced into the air/external EGR mixture upstream of the cylinder, in the intake ports or in the interior of the cylinder before and/or during the compression.

This self-ignition by compression of stratified carburetted charge can lead to a non-explosive combustion without particles or NOX if the local conditions of temperature and of concentrations are well controlled.

The first ignition can be triggered by an electric spark or high-pressure injection.

In order to guarantee symmetry of revolution of the combustive charge it is advantageous to orient the flows of cold gases introduced into the cylinder in order to create a movement of rotation of the combustive charge.

The structure best adapted to the control of the stratification is the axially symmetric 2-stroke engine described in U.S. Pat. No. 5,555,859, it being understood that in the present invention the fuel can be vaporised as described above.

U.S. Pat. No. 5,555,859 is also incorporated herein by reference for obtaining the stratification.

Nevertheless, a more conventional architecture permits an organisation of revolution about the axis of the cylinder by the following arrangements:

The modes B2 and B21 provide an intake volume limited to the volume drawn in by the engine at 1400 rpm. The section of the intake ports can therefore be taken to 28% of their normal value.

This makes it possible to use only one sector of the variable port consisting of the valve and its seat.

Two well-adapted geometries are described below for a cylinder head with 4 valves:

FIG. 11 represents the conventional architecture of a flat cylinder head bearing four valves with axes perpendicular to the plane of the cylinder head and of which the faces on the cylinder side are in the plane of the cylinder head in their closed position in order to comply with the geometry of revolution of the working chamber of the gases.

The two intake valves A are identical and diametrically opposed in order to create a symmetrical flow with respect to the axis of the cylinder which will acquire the symmetry of revolution at the end of compression. They are placed closest to the cylinder.

The two exhaust valves E are identical and diametrically opposed in order to create a flow which is symmetrical with respect to the axis of the cylinder which will acquire the symmetry of revolution at the end of compression. They are placed closest to the cylinder.

The two exhaust valves E are identical and diametrically opposed on a diameter which can be offset by 70 to 90 degrees with respect to that of the intakes in order to avoid interferences between the jets of air and the heads of the exhaust valves in the crossing situation (2-stroke case).

The injector is installed in a conventional manner in the centre of the pattern of valves.

The toroidal combustion chamber is situated in the piston and is coaxial therewith. Its neck is chosen to create the desired stratification.

As the filling and evacuation phases are largely separated there is no risk of interference between the piston and the valves. Therefore the piston does not have any recesses for the valves which would destroy the rotational geometry.

In order to generate a rotating flow the intake pipes orient the flow towards the piston tangentially to the cylinder in the vicinity of the valve seats. Two architectures are possible according to the lift of the valves:

Intake nozzle adapted to long lifts. The intake pipes 151 terminate upstream of the seat by an oblong convergent nozzle of which the neck 152 is defined by an upper half-cylinder resting on the upstream edge of the conical seat and tangent thereto along its generating line situated in a plane substantially perpendicular to the plane passing through the axis of the seat and through the axis of the cylinder and through a lower cylinder covering the half of the valve head opposite the said generating line.

The lift of the valves is such that they do not interfere with the jet of fluid coming from the nozzle, at least when fully open.

The nozzles will also be oriented so as to create a tangential velocity in opposite directions.

Intake nozzle adapted to short lifts. The conical bearing surface for sealing of the intake valves is extended by a cylindrical part with a height slightly greater than the lift of the said valves, the conical seats of the said valves are disposed at the bottom of cylindrical recesses 153 provided in the cylinder head in order to receive the said cylindrical parts of the said valves, in such a way that the lower flat face of the valves is in the plane of the cylinder head when they rest on their seats. The diametral clearance between the recesses and the cylindrical extensions of the valves is minimal.

Recesses are provided in the cylinder head within the following boundaries:

1) Two cylindrical portions concentric with the bore and tangent externally and internally to the cylindrical recess of each valve, where the external cylindrical portion can be merged with the cylinder.
2) A conical surface extending the half-seat of the valve delimited by a plane passing through its axis and the axis of the cylinder.
3) The recesses are also oriented so as to create a tangential velocity in opposite directions.

The angle of the intake seats is chosen between 90 and 120 degrees in order to optimise the stratification of the combustive charge.

Group C: Self-Scavenged 2-Stroke Engines with Variable Timing of the Valves

In a recycling context, the two-stroke cycle with self-scavenged variable distribution presents the following advantages:

- Natural hot internal recycling and disappearance of the handicap of background filling of the 2 strokes.
- Doubling of the specific power, the volumetric output of the two cycles being identical.
- Reduction in the delay between the generation of the active radicals present in the exhaust gases retained in the cylinder and their use in the following cycle.
- Reduction in the time during which the residual gases are present in the cylinder and the associated thermal losses.
- Disappearance of the pumping losses of the 4-stroke.
- Fewer losses by friction in the absence of a scavenging compressor coupled to the engine.
- Double rate of use of the high-pressure injection units.
- Significant and adjustable variation in the ratio of expansion rate to compression rate.
- Excellent transition between the atmospheric phase and the turbocharged phase.

By contrast, the EGR cooling involves special arrangements.

In order to simplify the comparison, the cylinder capacity of the 2-stroke engine is half that of the 2-stroke engine described above and the specification is identical.

It has no scavenging pump driven by the drive shaft.

With the aim of reducing the combustion starting temperature and increasing the thermal efficiency, the turbocharged propulsive phases are carried out over an asymmetric cycle with a high expansion ratio and a low compression ratio. This also makes it possible to increase the intake pressure whilst complying with the permitted limit as in the modes B.

The initial part of the combustion stroke is then used for the exchange of gases. The evacuation of the exhaust gases is ensured by an exhaust port or ports situated in the cylinder head and closed by valves controlled by one or several camshafts which can be phase-shifted relative to the crankshaft.

Filling is ensured by openings at the bottom of the cylinder which are opened by the piston in the vicinity of the bottom dead centre or, preferably, by at least one intake port situated in the cylinder head and oriented towards the piston and closed by at least one intake valve controlled by one or several fixed or phase-shiftable camshafts.

The architecture with directive intake valves as already described in FIG. 11 can be used for scavenging a 2-stroke cycle.

The charging philosophy is apparent from the modes B.

Reference will now be made to FIG. 6.

The charging structure is that of the 4-stroke engine in which the intake valve and the EGR bypass have been eliminated.

The EGR valve 104 has been replaced by a check valve or an aerodynamic diode 204.

The turbocharging is adapted to 0.1 Nmax and capable of a maximum pressure of 9 bars.

The turbocharging unit is of the type having the series configuration defined for the processes B.

Filling with cold gases is effected when the pressure in the cylinder is less than the intake pressure after discharge of the pressure Po at the end of expansion.

The external recycling means that the pressure of the gases is higher than the intake pressure.

This condition is met periodically in a pulsating exhaust manifold.

The pressure Pf in the cylinder upon closure of the cylinder is the pressure at the end of scavenging, close to the intake pressure.

Therefore the fraction of gas which is externally recyclable against the intake pressure is substantially equal to Po/Pf where Po is the pressure in the cylinder upon opening of the exhaust phase.

The mass of gas being constant between FE and OE, this gives:

$$Po/Pf = Vf/VO \times To/Tf$$

where Vo and Vf are the volumes occupied by the gases at OE and FE where To and Tf are the absolute temperatures of the gases at OE and FE.

The ratio Vf/Vo, which is none other than the ratio between the expansion ratio and the compression ratio, is controllable by phase-shifting of the camshafts.

As the thermal efficiency improves when Vf increases, the timings of OE in the vicinity of the BDC are favoured.

Tf is the total temperature at the inlet of the turbines which varies little between 900 and 1100° K. for 2-stage turbocharging where P3 remains close to P2.

To is the temperature of mixing the fresh air at 330° K., cold EGR at 330° K. and internal EGR at Tf.

For 50% of cold EGR it is necessary that: Po/Pf=2

For the maximum expansion ratio: Vo=C (cylinder volume at BDC)

Let us choose for example: Tf=990° K.

In cold EGR: To=330° K.

Therefore: Vf/Vo=Po/Pf×Tf/To=⅔

It may therefore be said that a timing of the valve complying with these conditions generates a proportion of cold EGR close to 50% when the excess volume is occupied by pure air.

This percentage varies rapidly around this timing and can therefore be controlled easily.

For OE at the BDC and FE at 70 degrees of the crankshaft after the BDC, we have:

The external EGR occupies, at the pressure P2, a volume substantially equal to C and to C/3 after cooling.

The trapped volume being 2C/3, the volume available for the fresh air and the residual gases is equal to C/3.

The turbocharging adapted to 0,1 Nmax will therefore give a proportion of external EGR of 50% 0.3 Nmax.

The internal EGR increases linearly above this speed whilst increasing Tf.

It follows that Pf/Po=⅔×900/To decreases with the speed.

The internal EGR is substituted progressively for the external EGR when the speed increases at the fixed timing of the valves.

In order to obtain the proportion of 50% at 0.2 Nmax it is necessary to advance the timings of the valves in order to increase Vf/Vo to obtain Pf=3 Po.

We have produced the hypothesis that the totality of the burst of exhaust is recycled externally. This is not realistic with the present architecture.

A more detailed description of the modes of operation with a pulsed exhaust manifold is given below.

As there is a risk of the EGR check valve being noisy, the aerodynamic diode is chosen for silenced engines.

The diode can basically consist of a calibrated opening having an intake bellmouth ne which is convergent on the manifold side ensuring a flow coefficient close to 1 and an outlet with sharp edges offering a coefficient of 0.5 to the reflux flow.

The burst of exhaust is shared between the turbine and the recycling conduit pro rata with their outlet sections.

The flow entering the diode benefits from a high expansion rate which can reach 3. The reflux flow generated by an expansion rate limited to 1.2 is moreover divided by 2 by its flow coefficient.

The diode can be dimensioned so as to absorb the mass of gas sufficient for the external recycling. This mass can be controlled by FE and/or OE which act on the pressure Po at the end of expansion.

A fine adjustment is ensured by the variable section of the diode controlled for example by a conical central body connected to an actuator capable of totally closing the diode.

FIG. 6 describes the simplest case of a single phase-shiftable camshaft 200 controlling the intake and the exhaust with the following sequence:

OA=30 degrees of the crankshaft after FE

FA=FE=70 degrees of the crankshaft after OA

Cold starting, acceleration of the turbochargers, engine brake.

Turbines working in series

Diode 204 closed

OE=100 degrees of the crankshaft before the BDC

OA=70 degrees of the crankshaft before the BDC

FE=FA=BDC

After OE the gases at high pressures and temperature are expanded on the HP turbine via the valve E and leave a depression in the cylinder which is completed by the fresh air at OA. A very hot mixture is recompressed at the second cycle in order to install very quickly a thermal level sufficient for silent ignition and effective catalysis.

Economical idling

Turbines working in series

Diode 204 closed

OE=80 degrees of the crankshaft before the BDC

OA=50 degrees of the crankshaft before the BDC

FE=FA=20 degrees of the crankshaft after the BDC

Mode C1:

depolluted urban driving power<0.33 Wmax fixed turbines working in series

P3 pulsed around P2<4.5 bars

Proportion of external EGR controlled by the diode section.

OE=50 degrees of the crankshaft before the BDC

OA=20 degrees of the crankshaft before the BDC

FE=FA=50 degrees of the crankshaft after the BDC

The burst of exhaust bears a fraction of the mass of hot gases present in the cylinder which is a function of Pc/Pin and which varies very quickly with the timing of FE and OE distant from 100 degrees of the crankshaft in the present case.

It has been seen previously that in cold EGR this fraction goes from 3 for a symmetrical timing FE=50 degrees of the crankshaft after the BDC to 1 for FE=110 degrees of the crankshaft after the BDC.

Therefore the advance of the camshaft simultaneously increases the flow in the turbine and in the recycling conduit in proportions which can be adjusted by the section of the diode.

With a fixed cross-section of the diode, an advanced timing increases P2 and the proportion of external EGR.

With fixing timing of the valves, the opening of the diode decreases the P2 and increases the proportion of external EGR.

With a fixed diode cross-section and fixed timing, the increase in the speed decreases the rate of delivery of fresh air which is replaced by hot internal EGR with the cycle displaced towards the right of the entropy diagram.

The ratio Po/Pf decreases when the speed increases to move from 3 at 1400 rpm to 1.3 for 5000 rpm.

To summarise, the hot EGR progressively replaces the cold EGR when the speed increases.

When the average flow through the diode stops, it must be closed in order to avoid an intake/exhaust bypass.

Mode C2

Partially depolluted driving on the open road.

Power varying from 0.33 to 0.66 Wmax.

Fixed turbines working in series 4.5 bars<P2<9 bars

N>0.2 Nmax

Diode active at low speed.

FE programmed between 60 and 90 degrees of the crankshaft after the BDC as a function of the P2 in order to limit the maximum pressure of the cycle When P2 moves from 4.5 bars to 9 bars it is necessary to retard the timing in order to comply with the pressure limit in the cylinder.

The external EGR decreases in favour of the internal EGR.

Mode C3:

Slightly depolluted driving on the motorway

Power varying between 0.66 and Wmax

P2=9 bars regulated by the opening of the HP turbine (waste gate or variable distributor).

N>0.4 Nmax

Diode closed

FE=90 degrees of the crankshaft after the BDC

Group D: Structure Adapted to Engines of the Future

For the 4-stroke or 2-stroke engines of the future, the invention provides a second charging structure described below in the case of the 2-stroke engine (FIG. 7):

It has the advantage of recycling externally all of the burst of exhaust.

The engine has two exhaust valves per cylinder, of which one (ER) is assigned to the external recycling conduit (ER) and the other (ET) to the supply of the turbine, and the engine then has two exhaust manifolds CT and CR.

A distributor valve VD makes it possible to share the flow of the manifold CR between the manifold CT and the recycling conduit.

When the two valves are open with the valve VD in the neutral position and the pressure in the cylinder greater than P2, the cylinder supplies the turbine and the recycling in parallel, the turbine taking priority with regard to its flow.

When one single valve is open and the valve VD isolates the two manifolds, the cylinder supplies one or the other circuit.

The valve VD must close the recycling conduit when the cylinder pressure is lower than P2 and ER is open to avoid an intake/exhaust bypass. The two valves then supply the turbine.

In the case of a cylinder with intake openings, the recycling is effected by a burst before the scavenging at low power and by discharge after the scavenging at high speed.

In the case of intake via a valve, the scavenging position may be chosen.

Scavenging at the BDC, before recycling, has the advantage of limiting the losses of air in the exhaust.

In fact the jets of fresh gas directed towards the piston are less disturbed by the speed of the gases in the course of evacuation. Moreover, the air mixed with the recycled volume is not lost for combustion.

Specialisation of the intake valves can also be envisaged when a stratification of the combustive mass is sought.

The following description relates to the second case of intake via valves with recycling before scavenging.

It will be based on the example of a scavenging camshaft with fixed timing 210 which controls the intake and ET and a recycling camshaft 211 with phase shifter 212 which controls ER. The cams are timed as follows:

Scavenging shaft:

OA=OET=20 degrees of the crankshaft before the BDC

FA=FET=50 degrees of the crankshaft after the BDC

Recycling shaft:

FER=60 degrees of the crankshaft after OER

Cold starting, acceleration of the turbochargers, engine brake.

Turbines working in series.

The valve VD blocks the recycling

OER=90 degrees of the crankshaft before the BDC

FER=30 degrees of the crankshaft before the BDC

OET=OA=20 degrees of the crankshaft before the BDC

FA=FET=50 degrees of the crankshaft after the BDC

After OER the gases at high temperature and pressure are expanded on the HP turbine via the valve ER and leave a depression in the cylinder which is made up by the fresh air at the BDC. A very hot mixture is recompressed in the second cycle in order very quickly to establish a thermal level sufficient for silent ignition and effective catalysis.

Economical idling

Turbines working in series

The valve VD blocks the recycling

OER=70 degrees of the crankshaft before the BDC

OET=OA=20 degrees of the crankshaft before the BDC

FER=10 degrees of the crankshaft before the BDC

FA=FET=50 degrees of the crankshaft after the BDC

Mode D1:

Depolluted urban driving.

Power<Wmax/3

Turbines working in series

The valve VD is in the recycling position.

OER=60 degrees of the crankshaft before the BDC

OET=OA=20 degrees of the crankshaft before the BDC

FER=BDC

FA=FET=50 degrees of the crankshaft after the BDC

P2<4.5 bars

N>2Nmax

The valve VD is in the recycling position.

There is a recycling flow regardless of the speed.

Mode D2:

Depolluted driving on the open road.

Power between ⅓ and ⅔ Wmax

Turbines working in series

The valve VD is in the recycling position.

OET=OA=20 degrees of the crankshaft before the BDC

OER=30 degrees of the crankshaft after the BDC

FA=FET=50 degrees of the crankshaft after the BDC

FER=90 degrees of the crankshaft after the BDC 4.5 bars<P2<9 bars

N>0.4Nmax

Cold EGR

During the transition which is effected rapidly, the valves ER and ET are opened simultaneously for a short instant.

When Pcyl>P2 a flow is established from the cylinder towards the recycling conduit.

When Pcyl<P2 a reflux replaces the cold EGR present in the scavenging air without disturbing the operation of the turbines.

Mode D3:

Driving on the motorway.

Power varying between ⅓ and ⅔ Wmax little depolluted

Turbines working in series

The valve VD blocks the recycling. The valves ER and ET supply the turbine at increased flow.

OET=OA=20 degrees of the crankshaft before the BDC

OER=30 degrees of the crankshaft after the BDC

FA=FET=50 degrees of the crankshaft after the BDC

FER=90 degrees of the crankshaft after the BDC

P2=9 bars regulated by opening of the HP turbine (waste gate or variable distributor).

N>0.4Nmax

Hot internal EGR.

The invention claimed is:

1. A method of operating a 4-stroke reciprocating engine wherein the engine is operating between a minimum speed of rotation Nmin and a maximum speed Nmax and comprises:

a turbocharging unit comprising:

a compressor which supplies an intake manifold of the engine with compressed air via a cooler;

a turbine which is supplied with a hot exhaust gas by an exhaust manifold of the engine at an exhaust temperature, the turbine defining an exhaust outlet section Sd offered to said hot exhaust gas; and an EGR bypass provided between the intake manifold and the exhaust manifold which EGR bypass is dimensioned to transfer a flow of gas between the intake manifold and the outlet manifold without substantial loss of pressure, such that a turbine inlet pressure substantially equal to a compressor discharge pressure;

such that, at constant air temperature and with a constant value of the exhaust outlet section Sd, the turbocharging unit delivers a substantially constant volume of cooled air Vc when the compressor discharge pressure varies, the constant volume of cooled air Vc being substantially proportional to the exhaust outlet section Sd offered to the hot exhaust gas, wherein the exhaust outlet section Sd is selected such that at a turbocharging adaptation speed Na, the volume drawn in by the engine is equal to the constant volume Vc, below the turbocharging adaptation speed Na, the volume drawn in by the engine is less than the constant volume of cooled air Vc, and a flow of the cooled air is deflected toward the turbocharging unit through the EGR bypass, and above the turbocharging adaptation speed Na and including the maximum speed Nmax, the volume drawn in by the engine is more than the constant volume of cooled air Vc, and a flow of exhaust gas is drawn in by the engine through the EGR bypass, wherein the EGR bypass has a gas cooler adjustable to control the temperature of the transferred flow of the hot exhaust gas, and wherein the method of operating includes controlling the EGR bypass temperature to create a desired excess of air for combustion in the engine; and wherein the exhaust outlet section Sd is selectively variable and is controlled:

at full load, to maintain a parameter at a limiting desired value thereof; and at partial load, to optimize depollution and/or performance according to a map stored in an engine control computer.

2. A method of operating a 4-stroke reciprocating engine wherein the engine is operating between a minimum speed of rotation Nmin and a maximum speed Nmax and comprises:

a turbocharging unit comprising:

a compressor which supplies an intake manifold of the engine with compressed air via a cooler;

a turbine which is supplied with a hot exhaust gas by an exhaust manifold of the engine at an exhaust temperature, the turbine defining an exhaust outlet section Sd offered to said hot exhaust gas; and an EGR bypass provided between the intake manifold and the exhaust manifold which EGR bypass is dimensioned to transfer a flow of gas between the intake manifold and the outlet manifold without substantial loss of pressure, such that a turbine inlet pressure is maintained substantially equal to a compressor discharge pressure;

such that, at constant air temperature and with a constant value of the exhaust outlet section Sd, the turbocharging unit delivers a substantially constant volume of cooled air Vc when the compressor discharge pressure varies, the constant volume of cooled air Vc being substantially proportional to the exhaust outlet section Sd offered to the hot exhaust gas, wherein the exhaust outlet section Sd is selected such that, at a turbocharging adaptation speed Na, the volume drawn in by the engine is equal to the constant volume Vc, below the turbocharging adaptation speed Na, the volume drawn in by the engine is less than the constant volume of cooled air Vc, and a flow of the cooled air is deflected toward the turbocharging unit through the EGR bypass, and above the turbocharging adaptation speed Na and including the maximum speed Nmax, the volume drawn in by the engine is more than the constant volume of cooled air Vc, and a flow of exhaust gas is drawn in by the engine through the EGR bypass, and wherein the EGR bypass has a gas cooler adjustable to control the temperature of the transferred flow of the hot exhaust gas; and wherein the method of operating includes controlling the EGR bypass temperature so that a mass of the transferred hot exhaust gas remains substantially equal to a mass of the fresh air up to the speed at which this temperature returns to the exhaust temperature, the mass of the transferred hot exhaust gas becoming greater than the mass of the fresh air above this speed.

3. A method of operating a 4-stroke reciprocating engine as claimed in claim 2, wherein the exhaust outlet section Sd is selectively variable and is controlled:

at full load, to maintain a parameter at a limiting desired value thereof; and at partial load, to optimize depollution and/or performance according to a map stored in an engine control computer.

4. A 4-stroke reciprocating engine operating between a minimum speed of rotation Nmin and a maximum speed Nmax comprising:

a turbocharging unit comprising:

a compressor which supplies an intake manifold of the engine with compressed air via a cooler;

a turbine which is supplied with a hot exhaust gas by an exhaust manifold of the engine at an exhaust temperature the turbine defining an exhaust outlet section Sd offered to said hot exhaust gas; and an EGR bypass provided between the intake manifold and the exhaust manifold which EGR bypass is dimensioned to transfer a flow of gas between the intake manifold and the outlet manifold without substantial loss of pressure, such that a turbine inlet pressure is maintained substantially equal to a compressor discharge pressure, such that, at constant air temperature and with a constant value of the exhaust outlet section Sd, the turbocharging unit delivers a substantially constant volume of cooled air Vc when the compressor discharge pressure varies, the constant volume of cooled air Vc being substantially proportional to the exhaust outlet section Sd offered to the hot exhaust gas, wherein the exhaust outlet section Sd is selected such that at a turbocharging adaptation speed Na, the volume drawn in by the engine is equal to the constant volume Vc, below the turbocharging adaptation speed Na, the volume drawn in by the engine is less than the constant volume of cooled air Vc, and a flow of the cooled air is deflected toward the turbocharging unit through the EGR bypass, and above the turbocharging adaptation speed Na and including the maximum speed Nmax, the volume drawn in by the engine is more than the constant volume of cooled air Vc, and a flow of exhaust gas is drawn in by the engine through the EGR bypass, wherein the EGR bypass has a gas cooler adjustable to control the temperature of the transferred flow of the hot exhaust gas, wherein the adjustment of the temperature is effected by controlling a bypass of the cooler, and wherein the gas cooler is totally bypassed when the engine does not deliver propulsive power.

5. A method of operating a 4-stroke reciprocating engine as claimed in claim 4, wherein the exhaust outlet section Sd is selectively variable and is controlled:

at full load, to maintain a parameter at a limiting desired value thereof; and at partial load, to optimize depollution and/or performance according to a map stored in an engine control computer.

6. A 4-stroke reciprocating engine operating between a minimum speed of rotation Nmin and a maximum speed Nmax comprising:

a turbocharging unit comprising:

a compressor which supplies an intake manifold of the engine with compressed air via a cooler;

a turbine which is supplied with a hot exhaust gas by an exhaust manifold of the engine at an exhaust temperature, the turbine defining an exhaust outlet section Sd offered to said hot exhaust gas; and an EGR bypass provided between the intake manifold and the exhaust manifold which EGR bypass is dimensioned to transfer a flow of gas between the intake manifold and the outlet manifold without substantial loss of pressure, such that a turbine inlet pressure is maintained substantially equal to a compressor discharge pressure, such that, at constant air temperature and with a constant value of the exhaust outlet section Sd, the turbocharging unit delivers a substantially constant volume of cooled air Vc when the compressor discharge pressure varies, the constant volume of cooled air Vc being substantially proportional to the exhaust outlet section Sd offered to the hot exhaust gas, wherein the exhaust outlet section Sd is selected such that at a turbocharging adaptation speed Na, the volume drawn in by the engine is equal to the constant volume Vc, below the turbocharging adaptation speed Na, the volume drawn in by the engine is less than the constant volume of cooled air Vc, and a flow of the cooled air is deflected toward the turbocharging unit through the EGR bypass, and above the turbocharging adaptation speed Na and including the maximum speed Nmax, the volume drawn in by the engine is more than the constant volume of cooled air Vc, and a flow of exhaust gas is drawn in by the engine through the EGR bypass, wherein the EGR bypass has a gas cooler adjustable to control the temperature of the transferred flow of the hot exhaust gas, wherein the adjustment of the temperature is effected by controlling a bypass of the cooler; and wherein for cold starting and operating at idling speed, the exhaust outlet section Sd and/or a timing of engine valves is adjusted so that the excess of combustion air is minimal for a desired level of depollution.

7. A method of operating a 4-stroke reciprocating engine as claimed in claim 6, wherein the exhaust outlet section Sd is selectively variable and is controlled:

at full load, to maintain a parameter at a limiting desired value thereof; and at partial load, to optimize depollution and/or performance according to a map stored in an engine control computer.

8. A 4-stroke reciprocating engine operating between a minimum speed of rotation Nmin and a maximum speed Nmax comprising:

a turbocharging unit comprising:

a compressor which supplies an intake manifold of the engine with compressed air via a cooler;

a turbine which is supplied with a hot exhaust gas by an exhaust manifold of the engine at an exhaust temperature, the turbine defining an exhaust outlet section Sd offered to said hot exhaust gas; and an EGR bypass provided between the intake manifold and the exhaust manifold which EGR bypass is dimensioned to transfer a flow of gas between the intake manifold and the outlet manifold without substantial loss of pressure, such that a turbine inlet pressure is maintained substantially equal to a compressor discharge pressure, such that, at constant air temperature and with a constant value of the exhaust outlet section Sd, the turbocharging unit delivers a substantially constant volume of cooled air Vc when the compressor discharge pressure varies, the constant volume of cooled air Vc being substantially proportional to the exhaust outlet section Sd offered to the hot exhaust gas, wherein the exhaust outlet section Sd is selected such that at a turbocharging adaptation speed Na, the volume drawn in by the engine is equal to the constant volume Vc, below the turbocharging adaptation speed Na, the volume drawn in by the engine is less than the constant volume of cooled air Vc, and a flow of the cooled air is deflected toward the turbocharging unit through the EGR bypass, and above the turbocharging adaptation speed Na and including the maximum speed Nmax, the volume drawn in by the engine is more than the constant volume of cooled air Vc, and a flow of exhaust gas is drawn in by the engine through the EGR bypass, wherein the EGR bypass has a gas cooler adjustable to control the temperature of the transferred flow of the hot exhaust gas, wherein the adjustment of the temperature is effected by controlling a bypass of the cooler, wherein the adaptation speed Na is substantially equal to Nmin/2 so that the volume of the transferred flow of the hot exhaust gas is at least equal to that of the fresh air, and wherein the minimum temperature of the transferred flow of the hot exhaust gas is close to the temperature of the fresh air so that a mass of the transferred flow of the hot exhaust gas is at least equal to that of the fresh air at the minimum speed used Nmin in order to depollute down to the minimum speed Nmin.

9. A 4-stroke reciprocating engine operating between a minimum speed of rotation Nmin and a maximum speed Nmax comprising:

a turbocharging unit comprising:

a compressor which supplies an intake manifold of the engine with compressed air via a cooler;

a turbine which is supplied with a hot exhaust gas by an exhaust manifold of the engine at an exhaust temperature, the turbine defining an exhaust outlet section Sd offered to said hot exhaust gas; and an EGR bypass provided between the intake manifold and the exhaust manifold which EGR bypass is dimensioned to transfer a flow of gas between the intake manifold and the outlet manifold without substantial loss of pressure, such that a turbine inlet pressure is maintained substantially equal to a compressor discharge pressure;

such that, at constant air temperature and with a constant value of the exhaust outlet section Sd, the turbocharging unit delivers a substantially constant volume of cooled air Vc when the compressor discharge pressure varies, the constant volume of cooled air Vc being substantially proportional to the exhaust outlet section Sd offered to the hot exhaust gas, wherein the exhaust outlet section Sd is selected such that, at a turbocharging adaptation speed Na, the volume drawn in by the engine is equal to the constant volume Vc, below the turbocharging adaptation speed Na, the volume drawn in by the engine is less than the constant volume of cooled air Vc, and a flow of the cooled air is deflected toward the turbocharging unit through the EGR bypass, and above the turbocharging adaptation speed Na and including the maximum speed Nmax, the volume drawn in by the engine is more than the constant volume of cooled air Vc, and a flow of exhaust gas is drawn in by the engine through the EGR bypass, wherein the turbocharging unit has a low-pressure LP turbocharger having an LP turbine and an LP compressor, and a high-pressure HP turbocharger having an HP turbine and an HP compressor, the LP and HP compressors working in series, wherein the exhaust outlet section Sd offered to the hot exhaust gases is adjustable between a minimum Sd min and a maximum Sd max by one or a combination of the following:

adjustment of a variable section of a gas distributor of the turbines, opening of a bypass between an inlet and an outlet of the turbines, and passage from a series configuration to a parallel configuration of the turbines, the turbocharging adaptation speed Na thus being adjustable, in a continuous or discontinuous manner, between two values Na min and Na max.

10. A 4-stroke reciprocating engine as claimed in claim 9, wherein the minimum exhaust outlet section Sd min offered to the gases is formed by the two turbines mounted in series, with variable distributors being at maximum closure.

11. A 4-stroke reciprocating engine as claimed in claim 10 wherein the maximum exhaust outlet section Sd max is formed by two turbines with fully open variable distributors mounted in series, and wherein the distributors are opened simultaneously in order to maintain the intake pressure at a maximum desired value thereof on a full load curve.

12. A 4-stroke reciprocating engine as claimed in claim 9, wherein the minimum exhaust outlet section Sd min offered to the hot exhaust gas is formed by the two turbines with fixed distributors mounted in series, waste gates of the turbines being in a closed position.

13. A 4-stroke reciprocating engine as claimed in claim 12, wherein a timing of engine valves is controlled to displace a closure of an associated cylinder between the vicinity of the BDC and the mid-stroke of an associated piston, wherein the maximum exhaust outlet section Sd is formed by the HP turbine in series configuration; and wherein the turbines are dimensioned to permit the compressors thereof to reach maximum pressure ratios thereof simultaneously.

14. A method of operating a 4-stroke reciprocating engine as claimed in claim 13, wherein a full load curve as a function of the speed is operated as follows:

from Nmin to 2 Nmin, an intake closure FA passes from the BDC to approximately 90 degrees of a crankshaft after the BDC to maintain a cycle pressure below a desired value thereof, and a distributor or an HP waste gate is closed;

from 2 Nmin to approximately 3 Nmin, the HP distributor or the HP waste gate is open to maintain an intake pressure at a maximum desired value thereof, and the intake closure FA is maintained at 90 degrees of the crankshaft after the BDC; and from 3 Nmin to Nmax, a global flow rate of fuel is kept constant to maintain the intake pressure at a limiting value thereof, and at partial load, a timing of intake closure FA is controlled according to a map stored in an engine control computer.

15. A method of operating a 4-stroke reciprocating engine as claimed in claim 14, wherein the exhaust outlet section Sd is selectively variable and is controlled:

at full load, to maintain a parameter at a limiting desired value thereof; and at partial load, to optimize depollution and/or performance according to a map stored in an engine control computer.

16. A 4-stroke reciprocating engine as claimed in claim 9, wherein the maximum exhaust outlet section Sd max offered to the gases is formed by the two turbines which have fixed distributors mounted in parallel, and wherein, in order to pass the turbines from the series configuration to the parallel configuration, the following manoeuvres are carried out successively:

progressive partial opening of an HP waste gate between the inlet and the outlet of the HP turbine, progressive and simultaneous partial opening of the HP waste gate and an LP waste gate between the inlet and the outlet of the LP turbine, and simultaneously and rapidly: total opening of the HP waste gate, total closure of the LP waste gate, and putting the outlet of the HP turbine into communication with the outlet of the LP turbine.

17. A 4-stroke reciprocating engine as claimed in claim 16, wherein, in order to limit a frequency of changing a configuration, the turbines are maintained in a series configuration for a type of driving which implements a limited power range, and crossing power thresholds corresponding to this configuration for manoeuvres of short duration by opening of one or both of the waste gates.

18. A method of operating a 4-stroke reciprocating engine as claimed in claim 17, wherein, the EGR bypass has an EGR valve to increase the turbine inlet pressure above the compressor discharge pressure, and the method includes crossing of the power thresholds by closure of the EGR valve and by opening of one or both of the waste gate.

19. A method of operating a 4-stroke reciprocating engine as claimed in claim 18, wherein the exhaust outlet section Sd is selectively variable and is controlled:

at full load, to maintain a parameter at a limiting desired value thereof; and at partial load, to optimize depollution and/or performance according to a map stored in an engine control computer.

20. A method of operating a 4-stroke reciprocating engine as claimed in claim 17, wherein the exhaust outlet section Sd is selectively variable and is controlled:

at full load, to maintain a parameter at a limiting desired value thereof; and at partial load, to optimize depollution and/or performance according to a map stored in an engine control computer.

21. A 4-stroke reciprocating engine as claimed in claim 16, wherein the LP waste gate has a second seat in order simultaneously to effect a closure of the LP turbine inlet/outlet bypass and putting the HP turbine outlet into communication with the LP turbine outlet.

22. A 4-stroke reciprocating engine as claimed in claim 16, wherein the two waste gates are concentric and have stops such that simultaneous movements thereof are actuated by one and communicated to the other by the stops.

23. A 4-stroke reciprocating engine as in claim 16, wherein the section of the HP waste gate fully opened is smaller than the section of the LP turbine to increase the gas flow through the HP turbine in the parallel configuration.

24. A 4-stroke reciprocating engine as claimed in claim 9, wherein the maximum outlet section Sd max offered to the gases is formed by the LP turbine with fixed distributor and the HP turbine with variable distributor mounted in parallel, an HP variable distributor being fully open, and wherein, in order to pass the turbines from the series configuration to the parallel configuration, the following manoeuvres are carried out successively:

progressive opening of a distributor of the HP turbine, progressive partial opening of an LP waste gate, simultaneously and rapidly: total opening of the LP waste gate and putting the outlet of the HP turbine into communication with the outlet of the LP turbine.

25. A 4-stroke reciprocating engine as claimed in claim 9, wherein the EGR bypass has an EGR valve to increase the turbine inlet pressure above the compressor discharge pressure; and wherein the method of operating includes, in order to limit a frequency of changing a configuration, maintaining the turbines in series configuration for a type of driving which implements a limited power range, and crossing power thresholds corresponding to this configuration for manoeuvres of short duration by closure of the EGR valve.

26. A method of operating a 4-stroke reciprocating engine as claimed in claim 25, wherein the exhaust outlet section Sd is selectively variable and is controlled:

at full load, to maintain a parameter at a limiting desired value thereof; and at partial load, to optimize depollution and/or performance according to a map stored in an engine control computer.

* * * * *